United States Patent
Kondo et al.

(10) Patent No.: US 11,934,711 B2
(45) Date of Patent: Mar. 19, 2024

(54) INFORMATION PROCESSING DEVICE, DISPLAY METHOD, AND NON-TRANSITORY COMPUTER-READABLE STORAGE MEDIUM STORING DISPLAY INFORMATION GENERATION PROGRAM

(71) Applicant: SEIKO EPSON CORPORATION, Tokyo (JP)

(72) Inventors: Toshiya Kondo, Shiojiri (JP); Jin Hasegawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/314,174

(22) Filed: May 9, 2023

(65) Prior Publication Data
US 2023/0367524 A1    Nov. 16, 2023

(30) Foreign Application Priority Data
May 12, 2022 (JP) ................. 2022-078541

(51) Int. Cl.
*G06F 3/12* (2006.01)

(52) U.S. Cl.
CPC .......... *G06F 3/1208* (2013.01); *G06F 3/1256* (2013.01)

(58) Field of Classification Search
USPC ....................................................... 358/1.9
See application file for complete search history.

(56) References Cited

U.S. PATENT DOCUMENTS

2007/0058186 A1* 3/2007 Tanaka ................. H04N 1/6088
358/1.9

FOREIGN PATENT DOCUMENTS

JP          H11-232444 A       8/1999

* cited by examiner

*Primary Examiner* — Jacky X Zheng
(74) *Attorney, Agent, or Firm* — WORKMAN NYDEGGER

(57) ABSTRACT

An information processing device includes: an image data input unit accepting an input of image data; a viewing condition setting acceptance unit accepting a setting of a first viewing condition and a second viewing condition; a color conversion unit converting the image data into first output image data adjusted to an appearance under the first viewing condition, based on a first profile including first spectral information corresponding to the first viewing condition, and converting the image data into second output image data adjusted to an appearance under the second viewing condition, based on a second profile including second spectral information corresponding to the second viewing condition; and a display information generation unit generating display information representing a display screen including the first output image and the second output image, based on the first output image data and the second output image data.

10 Claims, 13 Drawing Sheets

*FIG. 5*

PCC PROFILE 600

| WAVELENGTH | SPECTRAL INFORMATION OF VIEWER | | | SPECTRAL INFORMATION OF VIEWING LIGHT SOURCE |
|---|---|---|---|---|
| 380 nm | x(380) | y(380) | z(380) | P(380) |
| 385 nm | x(385) | y(385) | z(385) | P(385) |
| ..... | ..... | ..... | ..... | ..... |
| $\lambda$ nm | x($\lambda$) | y($\lambda$) | z($\lambda$) | P($\lambda$) |
| ..... | ..... | ..... | ..... | ..... |
| 775 nm | x(775) | y(775) | z(775) | P(775) |
| 780 nm | x(780) | y(780) | z(780) | P(780) |

INPUT PROFILE 560

| NAME | Version | DETAILS |
|---|---|---|
| IN1 | 2.* | XYZ PCS, D50, 2-DEGREE FIELD OF VIEW |
| IN2 | 5.*.* | ..... |
| ... | ... | ..... |

OUTPUT PROFILE 570

| NAME | Version | DETAILS |
|---|---|---|
| OUT1 | 5.*.* | Spectral PCS/Reflectance, Lab PCS, A, 2-DEGREE FIELD OF VIEW |
| OUT2 | 5.*.* | ..... |
| ... | ... | ..... |

DISPLAY PROFILE 580

| NAME | Version | DETAILS |
|---|---|---|
| DSP1 | 2.* | XYZ PCS, D50, 2-DEGREE FIELD OF VIEW |
| ... | ... | ..... |

PCC PROFILE 600

| NAME | Version | DETAILS |
|---|---|---|
| PCC1 | 5.*.* | Spectral PCS/Reflectance, D50, 2-DEGREE FIELD OF VIEW |
| PCC2 | 5.*.* | Spectral PCS/Reflectance, D65, 2-DEGREE FIELD OF VIEW |
| PCC3 | 5.*.* | Spectral PCS/Reflectance, F5, CUSTOM VIEWER |
| PCC4 | 5.*.* | Spectral PCS/Reflectance, A, 10-DEGREE FIELD OF VIEW |
| ... | ... | ..... |

INFORMATION PROCESSING DEVICE, DISPLAY METHOD, AND NON-TRANSITORY COMPUTER-READABLE STORAGE MEDIUM STORING DISPLAY INFORMATION GENERATION PROGRAM

The present application is based on, and claims priority from JP Application Serial Number 2022-078541, filed May 12, 2022, the disclosure of which is hereby incorporated by reference herein in its entirety.

BACKGROUND

1. Technical Field

The present disclosure relates to an information processing device processing an image, a display method, and a non-transitory computer-readable storage medium storing a display information generation program.

2. Related Art

A print image formed by a color printing device may look differently depending on a viewing condition such as a light source. JP-A-11-232444 discloses a technique of converting color data of an original image according to a color reproduction processing algorithm selected from among color reproduction processing algorithms corresponding to individual reference illumination light sources and then executing color printing of the image.

In the foregoing technique, unless the color printing of the image is executed, the way the image looks with the reference illumination light source cannot be checked and therefore the difference in the way the image looks with a plurality of different reference illumination light sources cannot be checked.

SUMMARY

According to an aspect of the present disclosure, an information processing device includes: an image data input unit accepting an input of image data representing an image; a viewing condition setting acceptance unit accepting a setting of a first viewing condition for the image and a second viewing condition for the image; a color conversion unit converting the image data into first output image data representing a first output image adjusted to an appearance under the first viewing condition, based on a first profile including first spectral information corresponding to the first viewing condition, and converting the image data into second output image data representing a second output image adjusted to an appearance under the second viewing condition, based on a second profile including second spectral information corresponding to the second viewing condition; and a display information generation unit generating display information representing a display screen including the first output image and the second output image, based on the first output image data and the second output image data.

According to another aspect of the present disclosure, a display method includes: an image data input step of accepting an input of image data representing an image; a viewing condition setting acceptance step of accepting a setting of a first viewing condition for the image and a second viewing condition for the image; a color conversion step of converting the image data into first output image data representing a first output image adjusted to an appearance under the first viewing condition, based on a first profile including first spectral information corresponding to the first viewing condition, and converting the image data into second output image data representing a second output image adjusted to an appearance under the second viewing condition, based on a second profile including second spectral information corresponding to the second viewing condition; and a display step of displaying a display screen including the first output image and the second output image, based on the first output image data and the second output image data.

According to still another aspect of the present disclosure, a non-transitory computer-readable storage medium storing a display information generation program is provided. The display information generation program causes a computer to implement: an image data input function of accepting an input of image data representing an image; a viewing condition setting acceptance function of accepting a setting of a first viewing condition for the image and a second viewing condition for the image; a color conversion function of converting the image data into first output image data representing a first output image adjusted to an appearance under the first viewing condition, based on a first profile including first spectral information corresponding to the first viewing condition, and converting the image data into second output image data representing a second output image adjusted to an appearance under the second viewing condition, based on a second profile including second spectral information corresponding to the second viewing condition; and a display information generation function of generating display information representing a display screen including the first output image and the second output image, based on the first output image data and the second output image data.

BRIEF DESCRIPTION OF THE DRAWINGS

FIG. 5 schematically shows an example of the structure of a PCC profile.

FIG. 6 schematically shows an example of a profile group used for a metamerism simulation.

DESCRIPTION OF EXEMPLARY EMBODIMENTS

An embodiment of the present disclosure will now be described. Of course, the embodiment described below simply illustrates the present disclosure and not all the features described in the embodiment are necessarily essential for the solution of the present disclosure.

(1) OUTLINE OF TECHNIQUE INCLUDED IN PRESENT DISCLOSURE

First, an outline of a technique included in the present disclosure will be described with reference to examples shown in FIGS. 1 to 15. The drawings in the present application schematically show examples. The rate of magnification in each direction shown in these drawings may vary. The drawings may not be consistent with each other. Of course, each element of this technique is not limited to a specific example indicated by a symbol. In the "Outline of Technique Included in Present Disclosure" section, a description in parentheses refers to a supplementary explanation of an immediately preceding term.

In the present application, a numerical range "Min to Max" refers to a range equal to or greater than a minimum value Min and equal to or smaller than a maximum value Max.

Aspect 1

Figure 1:
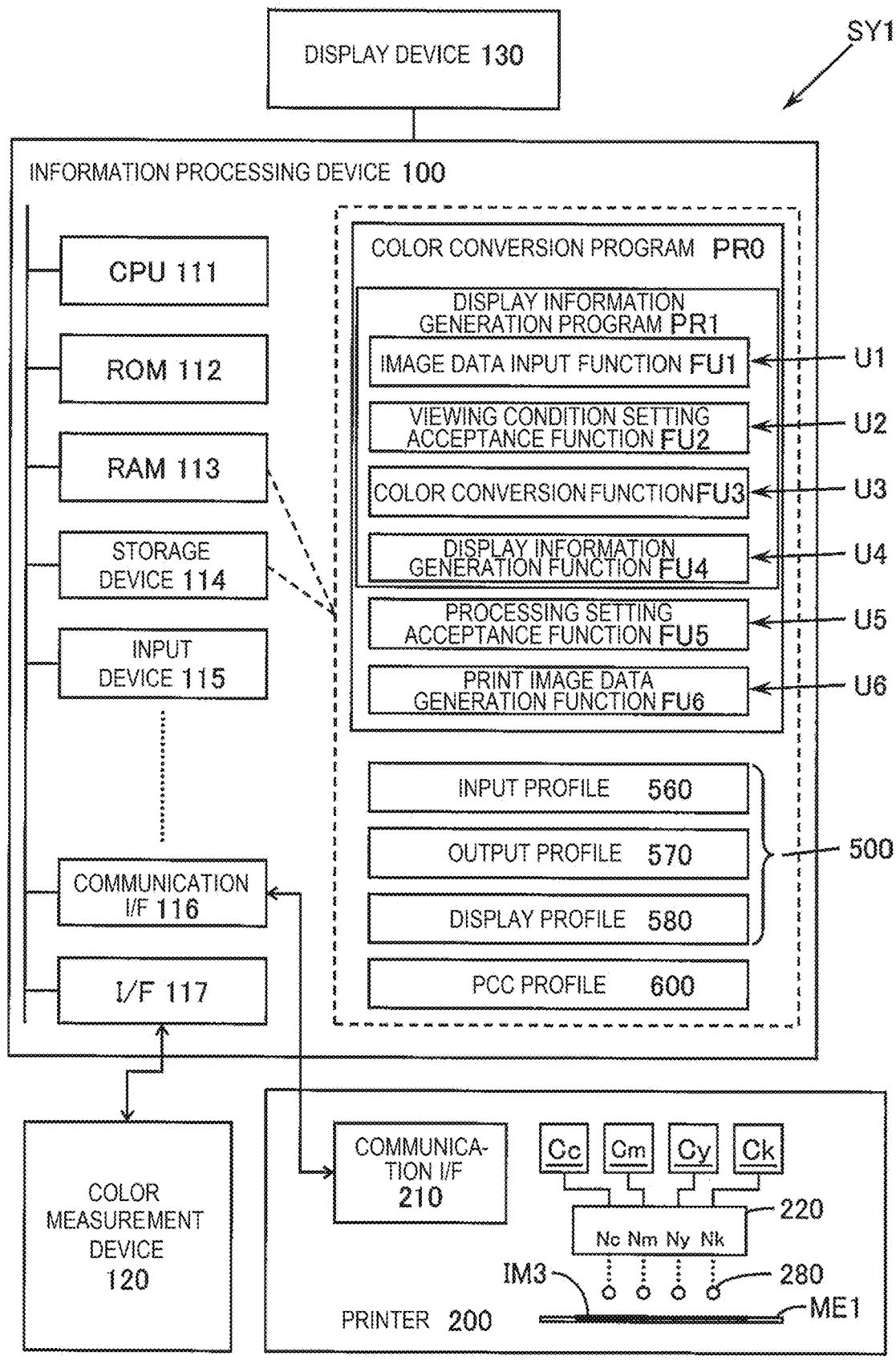
FIG. 1 is a block diagram schematically showing an example of the configuration of a color conversion system.
Figure 9:
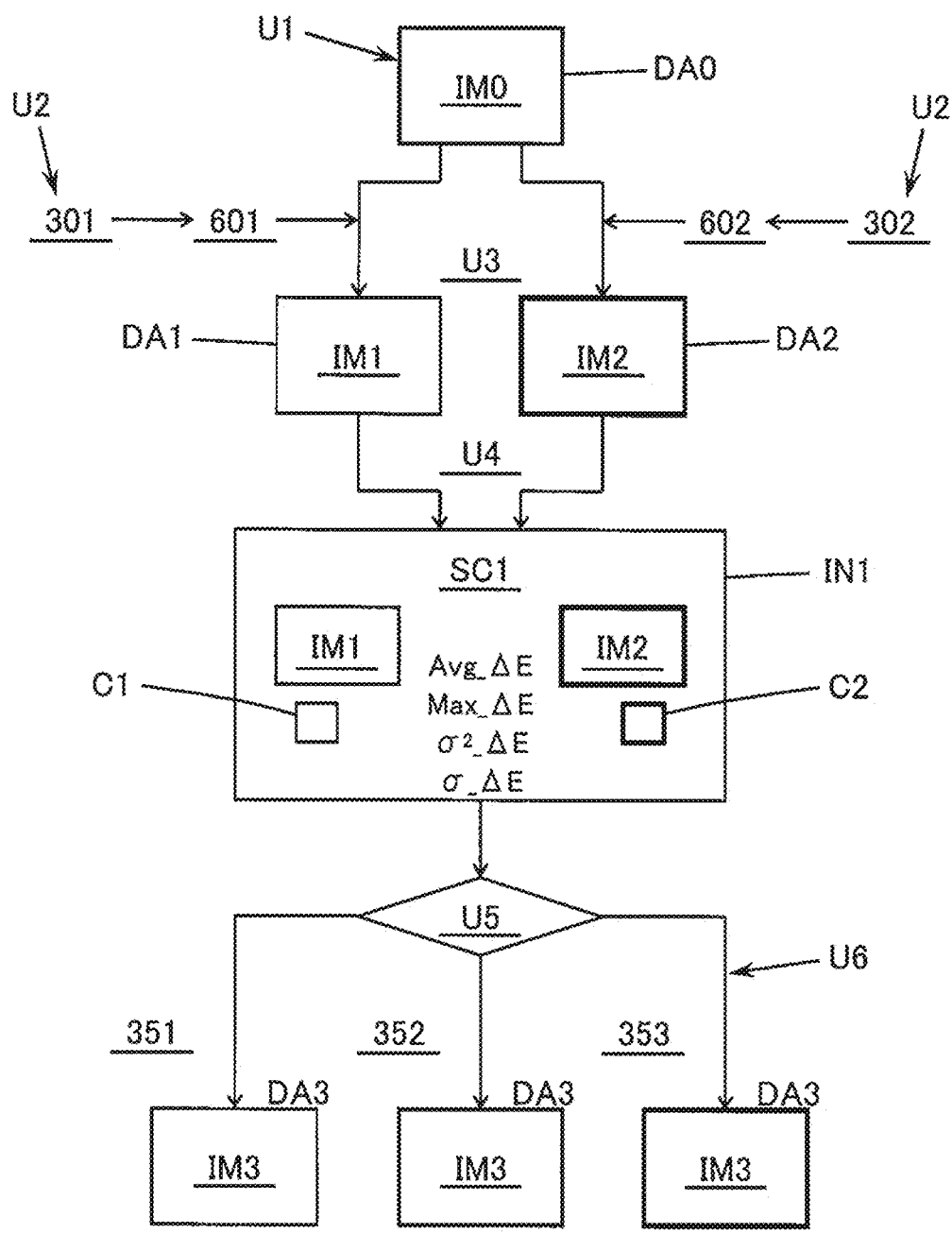
FIG. 9 is a block diagram schematically showing an example of the color conversion processing performed by the information processing device.

An information processing device 100 according to an aspect of the present technique has an image data input unit U1, a viewing condition setting acceptance unit U2, a color conversion unit U3, and a display information generation unit U4, as illustrated in FIGS. 1 and 9. The image data input unit U1 accepts an input of image data DA0 representing an image IM0. The viewing condition setting acceptance unit U2 accepts a setting of a first viewing condition 301 for the image IM0 and a second viewing condition 302 for the image IM0. The color conversion unit U3 converts the image data DA0 into first output image data DA1 representing a first output image IM1 adjusted to an appearance under the first viewing condition 301, based on a first profile (for example, a PCC profile 601) including first spectral information 311 corresponding to the first viewing condition 301. The color conversion unit U3 also converts the image data DA0 into second output image data DA2 representing a second output image IM2 adjusted to an appearance under the second viewing condition 302, based on a second profile (for example, a PCC profile 602) including second spectral information 312 corresponding to the second viewing condition 302. The display information generation unit U4 generates display information IN1 representing a display screen SC1 including the first output image IM1 and the second output image IM2, based on the first output image data DA1 and the second output image data DA2.

As a display device displays the display screen SC1 according to the display information IN1, the display screen SC1 including the first output image IM1 adjusted to the appearance under the first viewing condition 301 and the second output image IM2 adjusted to the appearance under the second viewing condition 302 is displayed. A user viewing this display screen SC1 can check the difference in the way the image IM0 looks under the first viewing condition 301 and under the second viewing condition 302. Thus, according to the above aspect, the user can check the difference in the way an image looks under a plurality of different viewing conditions without viewing a printed object under the viewing conditions.

The viewing condition includes the type of the light source, the field of view of the viewer, and the like.

When the information processing device has a display device, the information processing device may display the screen including the first output image and the second output image according to the display information. When the information processing device is coupled to a display device, the information processing device may output the display information to the display device and thus may cause the display device to display the screen including the first output image and the second output image.

The terms "first", "second", and the like in the present application are terms for identifying each component element included in a plurality of component elements having a similarity and therefore do not refer to any order. Which component element of the plurality of component elements is equivalent to the "first", "second" or the like is decided in relative terms.

The foregoing additional description also applies to the aspects described below.

Aspect 2

Figure 8:
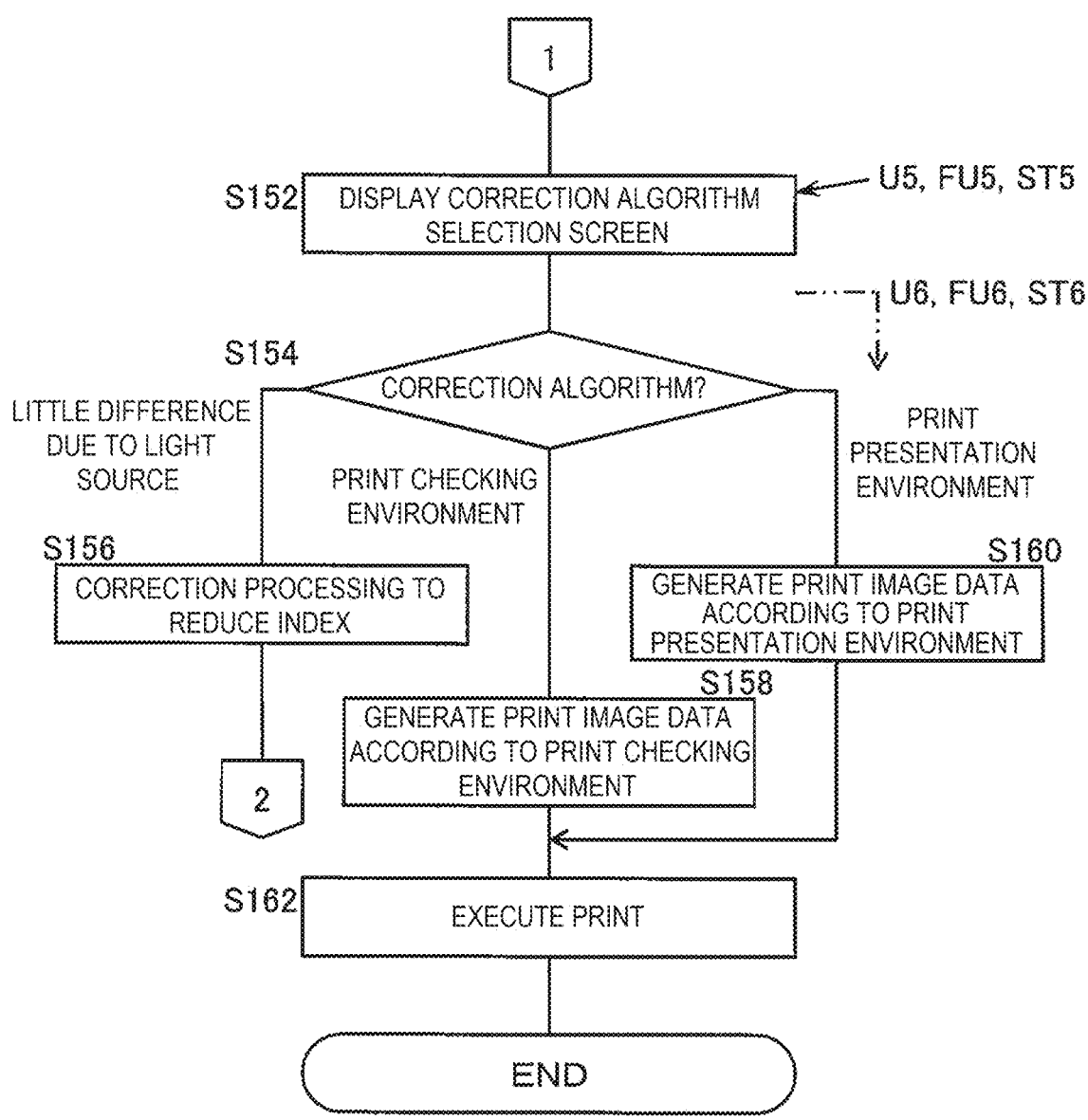
FIG. 8 is a flowchart schematically showing an example of the color conversion processing performed by the information processing device.

As illustrated in FIGS. 8 and 9, the present information processing device 100 may also have a print image data generation unit U6 generating print image data DA3 representing a print image IM3. The print image data generation unit U6 may be able to generate the print image data DA3 in such a way that the print image IM3 is expressed in a color between the first output image IM1 and the second output image IM2.

In the above case, the print image IM3 adjusted as much as possible to both the appearance under the first viewing condition 301 and the appearance under the second viewing condition 302 is formed. Thus, the above aspect can provide an example of reducing metamerism generated by a difference in the viewing condition.

Aspect 3

As illustrated in FIGS. 8 and 9, the present information processing device 100 may also have a processing setting acceptance unit U5 accepting a selection of processing to be executed by the print image data generation unit U6 from among a plurality of types of processing of generating the print image data DA3 in such a way that the print image IM3 is expressed in a color in a range from the color of the first output image IM1 to the color of the second output image IM2. The print image data generation unit U6 may generate the print image data DA3 according to the processing selected by the processing setting acceptance unit U5.

In the above case, processing to be executed by the information processing device 100 can be selected from a plurality of types of processing of generating the print image IM3 reflecting a set viewing condition. Thus, the above aspect can enhance convenience.

Aspect 4

As illustrated in FIGS. 8 and 9, the plurality of types of processing may include first processing 351 of generating the print image data DA3 in such a way that the print image IM3 is expressed in a color between the first output image IM1 and the second output image IM2. The plurality of types of processing may also include at least one of second processing 352 of generating the print image data DA3 in such a way that the print image IM3 is expressed in the color of the first output image IM1, and third processing 353 of generating the print image data DA3 in such a way that the print image IM3 is expressed in the color of the second output image IM2.

The above aspect can provide a preferred example for selecting processing to be executed by the information processing device from among a plurality of types of processing of generating a print image reflecting a set viewing condition.

Aspect 5

Figure 7:
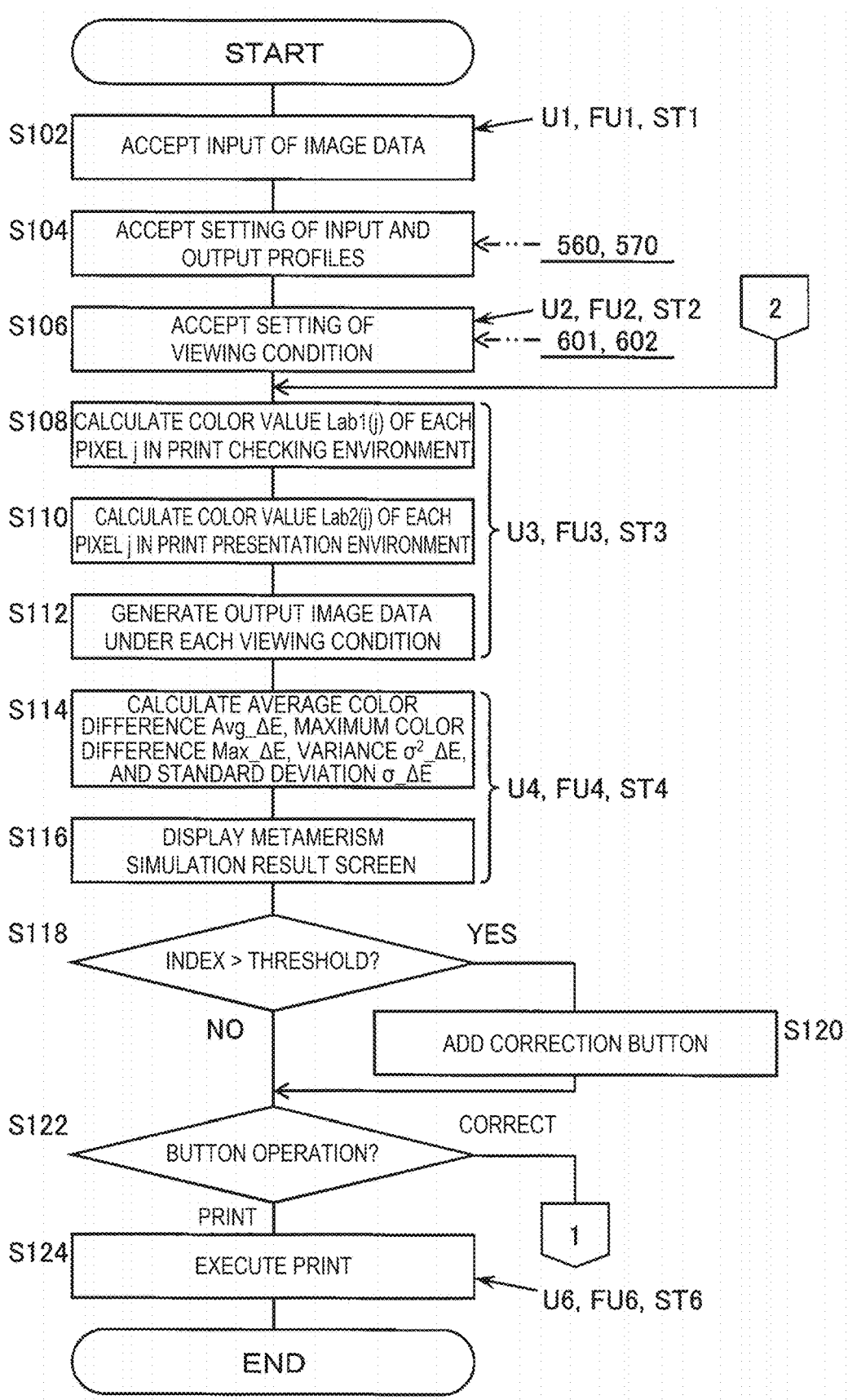
FIG. 7 is a flowchart schematically showing an example of color conversion processing performed by an information processing device.

As illustrated in FIG. 7, the display information generation unit U4 may calculate an index 700 indicating the difference in the appearance between the first output image IM1 and the second output image IM2, based on a color value Lab1(j) corresponding to the first output image IM1 and a color value Lab2(j) corresponding to the second output image IM2. The display information generation unit U4 may generate the display information IN1 representing the display screen SC1 including the index 700.

According to the above aspect, the index 700 indicating the difference in the appearance of the image IM0 under a plurality of different viewing conditions is displayed. Thus, the difference in the appearance of an image under a plurality of different viewing conditions can be objectively checked.

Aspect 6

As illustrated in FIG. 7, the index 700 may include at least a part of an average value Avg_$\Delta$E of a color difference per part between the first output image IM1 and the second output image IM2, a maximum value Max $\Delta$E of the color difference per part between the first output image IM1 and the second output image IM2, a variance value $\sigma^2$_$\Delta$E of the color difference per part between the first output image IM1 and the second output image IM2, and a standard deviation value $\sigma$_$\Delta$E of the color difference per part between the first output image IM1 and the second output image IM2.

The above aspect can provide a preferred example of being able to objectively check the difference in the appearance of an image under a plurality of different viewing conditions.

The part for which the index is calculated, in the output image, includes a pixel, a pixel group within a predetermined range such as 2×2 pixels, or the like. This additional description also applies to the aspects described below.

Aspect 7

Figure 13:
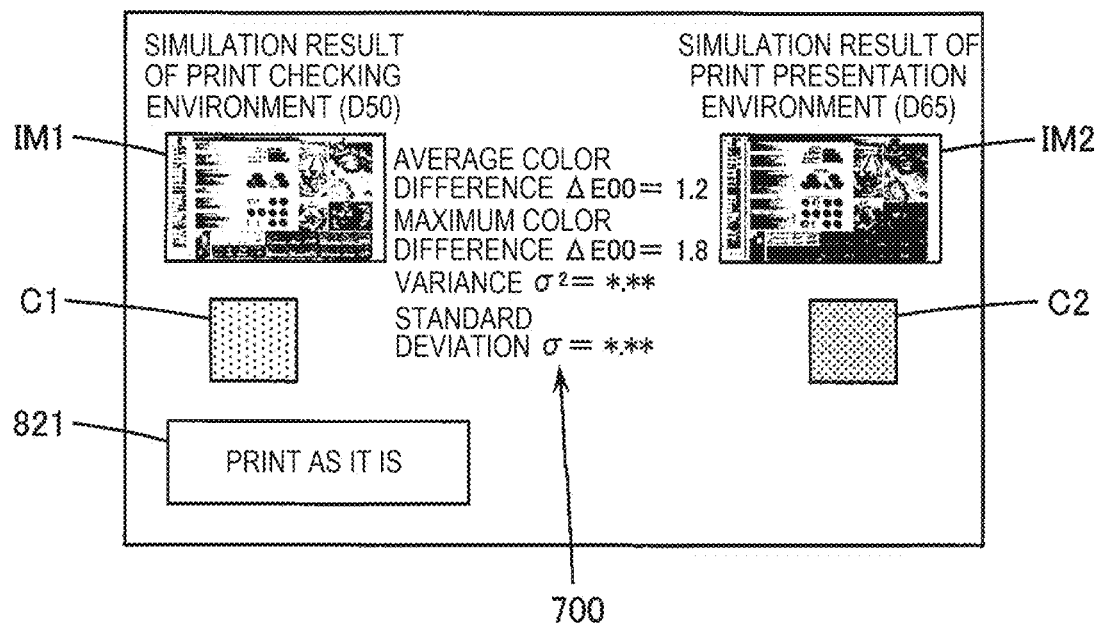
FIG. 13 schematically shows an example of the metamerism simulation result screen.

The display information generation unit U4 may specify a site having a maximum color difference per part between the first output image IM1 and the second output image IM2, based on the color value Lab1(j) corresponding to the first output image IM1 and the color value Lab2(j) corresponding to the second output image IM2. As illustrated in FIG. 13, the display information generation unit U4 may generate the display information IN1 representing the display screen SC1 including a display area for a color C1 of the first output image IM1 at the site and a display area for a color C2 of the second output image IM2 at the site.

According to the above aspect, the color at the site having the maximum color difference in the image IM0 under a plurality of different viewing conditions is displayed. Thus, the difference in the way an image looks under a plurality of different viewing conditions can be checked more easily.

Aspect 8

Figure 11:
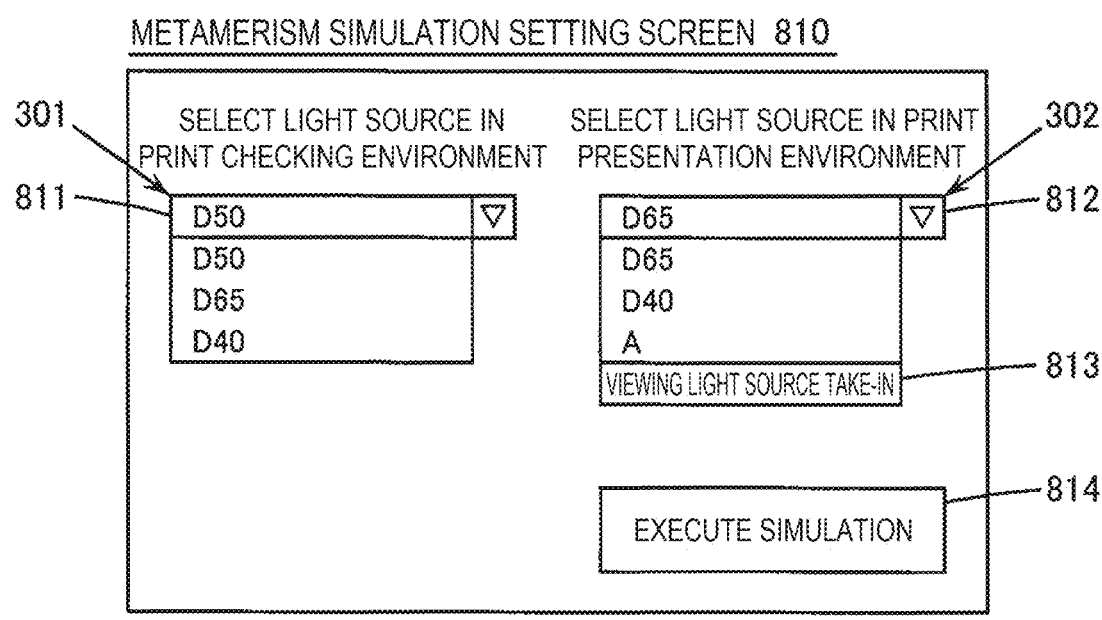
FIG. 11 schematically shows an example of a metamerism simulation setting screen.

As illustrated in FIG. 11, the viewing condition setting acceptance unit U2 may be able to accept an input of the second spectral information 312. The color conversion unit U3 may convert the image data DA0 into the second output image data DA2, based on the second spectral information 312, when the input of the second spectral information 312 is accepted.

According to the above aspect, the difference in the way an image looks under a plurality of different viewing conditions including a viewing condition that is not a standard viewing condition can be checked.

Aspect 9

Incidentally, as illustrated in FIGS. 7 to 9, a display method according an aspect of the present technique includes the following steps:

(S1) an image data input step ST1 of accepting an input of the image data DA0 representing the image IM0;

(S2) a viewing condition setting acceptance step ST2 of accepting a setting of the first viewing condition 301 for the image IM0 and the second viewing condition 302 for the image IM0;

(S3) a color conversion step ST3 of converting the image data DA0 into the first output image data DA1 representing the first output image IM1 adjusted to the appearance under the first viewing condition 301, based on the first profile (601) including the first spectral information 311 corresponding to the first viewing condition 301, and converting the image data DA0 into the second output image data DA2 representing the second output image IM2 adjusted to the appearance under the second viewing condition 302, based on the second profile (602) including the second spectral information 312 corresponding to the second viewing condition 302; and (S4) a display step ST4 of displaying the display screen SC1 including the first output image IM1 and the second output image IM2, based on the first output image data DA1 and the second output image data DA2.

The display screen SC1 includes the first output image IM1 adjusted to the appearance under the first viewing condition 301 and the second output image IM2 adjusted to the appearance under the second viewing condition 302. The user viewing the display screen SC1 can check the difference in the way the image IM0 looks under the first viewing condition 301 and under the second viewing condition 302. Thus, according to the above aspect, too, the user can check the difference in the way an image looks under a plurality of different viewing conditions without viewing a printed object under the viewing conditions.

A color conversion method including this display method may further include a print image data generation step ST6 corresponding to the print image data generation unit U6, and a processing setting acceptance step ST5 corresponding to the processing setting acceptance unit U5.

Aspect 10

As illustrated in FIGS. 1, 7 and 8, a display information generation program PR1 according to an aspect of the present technique causes a computer (for example, the information processing device 100) to implement an image data input function FU1 corresponding to the image data input unit U1, a viewing condition setting acceptance function FU2 corresponding to the viewing condition setting acceptance unit U2, a color conversion function FU3 corresponding to the color conversion unit U3, and a display information generation function FU4 corresponding to the display information generation unit U4. According to this aspect, too, the user can check the difference in the way an image looks under a plurality of different viewing conditions without viewing a printed object under the viewing conditions. A color conversion program PR0 including this display information generation program PR1 may cause the computer (100) to implement a print image data generation function FU6 corresponding to the print image data generation unit U6, and a processing setting acceptance function FU5 corresponding to the processing setting acceptance unit U5.

The present technique can also be applied to an information processing system including the foregoing information processing device, a print control method including the foregoing color conversion method, a printing method including the print control method, a print control program including the foregoing color conversion program, a computer-readable medium in which one of the foregoing programs is recorded, and the like. The foregoing information processing device may be formed of a plurality of distributed parts.

(2) SPECIFIC EXAMPLE OF CONFIGURATION OF COLOR CONVERSION SYSTEM

FIG. 1 schematically shows an example of the configuration of a color conversion system. A color conversion system SY1 shown in FIG. 1 includes the information processing device 100, a display device 130, and an inkjet printer 200. The color conversion system SY1 may include a color measurement device 120. The information processing device 100 has a CPU 111, which is a processor, a ROM 112, a RAM 113, a storage device 114, an input device 115, a communication I/F 116, and the like. CPU is an abbreviation of central processing unit. ROM is an abbreviation of read-only memory. RAM is an abbreviation of random-access memory. I/F is an abbreviation of interface. The information processing device 100 may have an I/F for color measurement device 117. The foregoing elements (111 to 117) are electrically coupled together and can input and output information from and to each other. The ROM 112, the RAM 113, and the storage device 114 are memories. At least the ROM 112 and the RAM 113 are semiconductor memories. Based on display information from the information processing device 100, the display device 130 displays a screen corresponding to the display information. As the display device 130, a liquid crystal display panel or the like can be used.

The storage device 114 stores an OS, not illustrated, the color conversion program PR0, a color conversion profile 500, a PCC profile 600, and the like. OS is an abbreviation of operating system. PCC is an abbreviation of profile connection condition. The color conversion profile 500 collectively refers to an input profile 560, an output profile 570, and a display profile 580. As the storage device 114, a non-volatile semiconductor memory such as a flash memory, a magnetic storage device such as a hard disk, or the like, can be used.

As the input device 115, a pointing device, a hard key including a keyboard, a touch panel attached to the surface of a display panel, or the like, can be used. The communication I/F 116 is coupled to a communication I/F 210 of the printer 200 and inputs and outputs information such as print data from and to the printer 200. The I/F for color measurement device 117 is coupled to the color measurement device 120 and acquires color measurement data including a color measurement value from the color measurement device 120. As the standard for the I/Fs 116, 117, 210, a USB standard, a short-range wireless communication standard, or the like, can be used. The communication by the communication I/Fs 116, 117, 210 may be wired or wireless and may be a network communication via a LAN or the internet. USB is an abbreviation of universal serial bus. LAN is an abbreviation of local area network.

The color measurement device 120 can measure each color patch formed on a print substrate, which is an example of a medium where a color chart is formed, and can output color measurement data. The patch is also referred to as a color chart. The information processing device 100 can acquire the color measurement data from the color measurement device 120 and can execute various kinds of processing.

The color conversion program PR0 shown in FIG. 1 includes the display information generation program PR1. The display information generation program PR1 causes the information processing device 100 to implement the image data input function FU1, the viewing condition setting acceptance function FU2, the color conversion function FU3, and the display information generation function FU4. The color conversion program PR0 causes the information processing device 100 to implement the processing setting acceptance function FU5 and the print image data generation function FU6 in addition to the foregoing functions (FU1 to FU4).

The CPU 111 of the information processing device 100 reads out information stored in the storage device 114 into the RAM 113 according to need, then executes the read-out program, and thus performs various kinds of processing. The CPU 111 executes the color conversion program PR0 read out into the RAM 113 and thus performs processing corresponding to the foregoing functions (FU1 to FU6). The color conversion program PR0 causes the information processing device 100, which is a computer, to function as the image data input unit U1, the viewing condition setting acceptance unit U2, the color conversion unit U3, the display information generation unit U4, the processing setting acceptance unit U5, and the print image data generation unit U6. The information processing device 100 executing the color conversion program PR0 implements, along with the display device 130, the image data input step ST1, the viewing condition setting acceptance step ST2, the color conversion step ST3, the display step ST4, the processing setting acceptance step ST5, and the print image data generation step ST6. The computer-readable medium storing the color conversion program PR0 causing the computer to implement the foregoing functions (FU1 to FU6) is not limited to an internal storage device in the information processing device and may be a recording medium external to the information processing device.

The information processing device 100 includes a computer or the like, such as a personal computer. For example, when the main body of a desktop personal computer is applied to the information processing device 100, normally, the display device 130, the color measurement device 120, and the printer 200 are coupled to this main body. When a computer with a display device integrated therein, such as a laptop personal computer or a tablet terminal, is applied to the information processing device 100, normally, the color measurement device 120 and the printer 200 are coupled to this computer. The information processing device with a display device integrated therein is no different in outputting display information to the internal display device. The information processing device 100 may have all the component elements (111 to 117) within one casing. However, the information processing device 100 may be formed of a plurality of devices divided in such a way as to be able to communicate with each other. Also, the present technique can be implemented even when at least a part of the display device 130, the color measurement device 120, and the printer 200 is provided in the information processing device 100.

The printer 200 shown in FIG. 1 is assumed to be an inkjet printer that ejects a C ink, an M ink, a Y ink, and a K ink as color materials from a recording head 220 and thus forms a print image IM3 corresponding to print image data. C means cyan. M means magenta. Y means yellow. K means black. The recording head 220 is supplied with the C, M, Y, and K inks from ink cartridges Cc, Cm, Cy, and Ck, respectively, and ejects C, M, Y, and K ink droplets 280 from nozzles Nc, Nm, Ny, and Nk, respectively. When the ink droplets 280 land on a print substrate ME1, ink dots are formed on the print substrate ME1. Consequently, a printed object having the print image IM3 on the print substrate ME1 is provided.

(3) PRINCIPLE THAT APPEARANCE OF PRINT IMAGE VARIES ACCORDING TO VIEWING CONDITION

The appearance of an object differs according to the viewing condition. This is because the appearance to the human eye depends on the spectral energy of the viewing light source and the field of view of the viewer. Generally, as shown in an equation (1) given below, tristimulus values X, Y, Z corresponding to the appearance to the human eye are expressed by the spectral energy $P(\lambda)$ of the viewing light source, the spectral reflectance $R_r(\lambda)$ of the object, the color-matching functions $x(\lambda)$, $y(\lambda)$, $z(\lambda)$ corresponding to the spectral sensitivity of the viewer, and a normalization factor k.

$$X = k \int P(\lambda) R_r(\lambda) x(\lambda) d\lambda$$

$$Y = k \int P(\lambda) R_r(\lambda) y(\lambda) d\lambda$$

$$Z = k \int P(\lambda) R_r(\lambda) z(\lambda) d\lambda \qquad (1)$$

The integration range is a visible range, for example, 380 to 780 nm.

The CIE (International Commission on Illumination) defines a D50 light source, a D65 light source, a D93 light source, an F2 light source, a D55 light source, an A light source, or the like, as a standard viewing light source. Of course, the spectral energy $P(\lambda)$ differs according to the type of the viewing light source.

The tristimulus values X, Y, Z change according to the human field of view. Thus, the CIE defines a viewer with a 2-degree field of view as a colorimetric standard viewer.

The CIE also defines a L*a*b* color space, which is a device-independent color space. A color value L*a*b* in the L*a*b* color space can be calculated by converting the tristimulus values X, Y, Z, using a predetermined conversion formula. Hereinafter, "*" is omitted.

In order to use a printer such as an inkjet printer for the purpose of calibration of printing such as offset printing, an ICC (International Color Consortium) profile representing the correspondence relationship between a device-dependent color and a device-independent color is used. The device-dependent color of a printing machine such as an offset printing machine or a printer is expressed by a coordinate value in a device-dependent color space and is expressed, for example, by CMYK values representing the amounts of the C, M, Y, and K inks used. The device-independent color is expressed, for example, by a color value in a device-independent color space such as the CIE XYZ color space or the CIE Lab color space.

The viewing condition may differ between an original image and a print image. In this case, it is conceivable that the user prepares a viewing light source in order to check the difference in the appearance of color due the difference in the viewing condition, and actually prints an image and visually checks the difference by viewing the printed object. In this case, the user needs to purchase a light source device for the viewing light source and needs an ink and a print substrate for printing an image. Also, in order to accurately measure the color of the print image, the user needs to purchase a color measurement device.

According to the ICC profile version 4, only the conversion of a white point can be performed and therefore a simulation of the appearance of a color corresponding to the viewing environment cannot be executed. Also, a media profile needs to be created every time the viewing light source is changed. Moreover, since the ICC profile version 4 only supports the standard light source such as the D65 light source or the D50 light source, a simulation of the appearance of a color corresponding to the viewing environment cannot be executed when the actual viewing light source differs from the standard light source.

In this specific example, the difference in the way a print image looks under various viewing conditions can be checked by simulating the appearance of the print image under the various viewing conditions without needing a light source device and without printing an image.

(4) SPECIFIC EXAMPLE OF COLOR MANAGEMENT SYSTEM

An example of a color management system to which the present technique can be applied will now be described with reference to FIG. 2.

Figure 2:
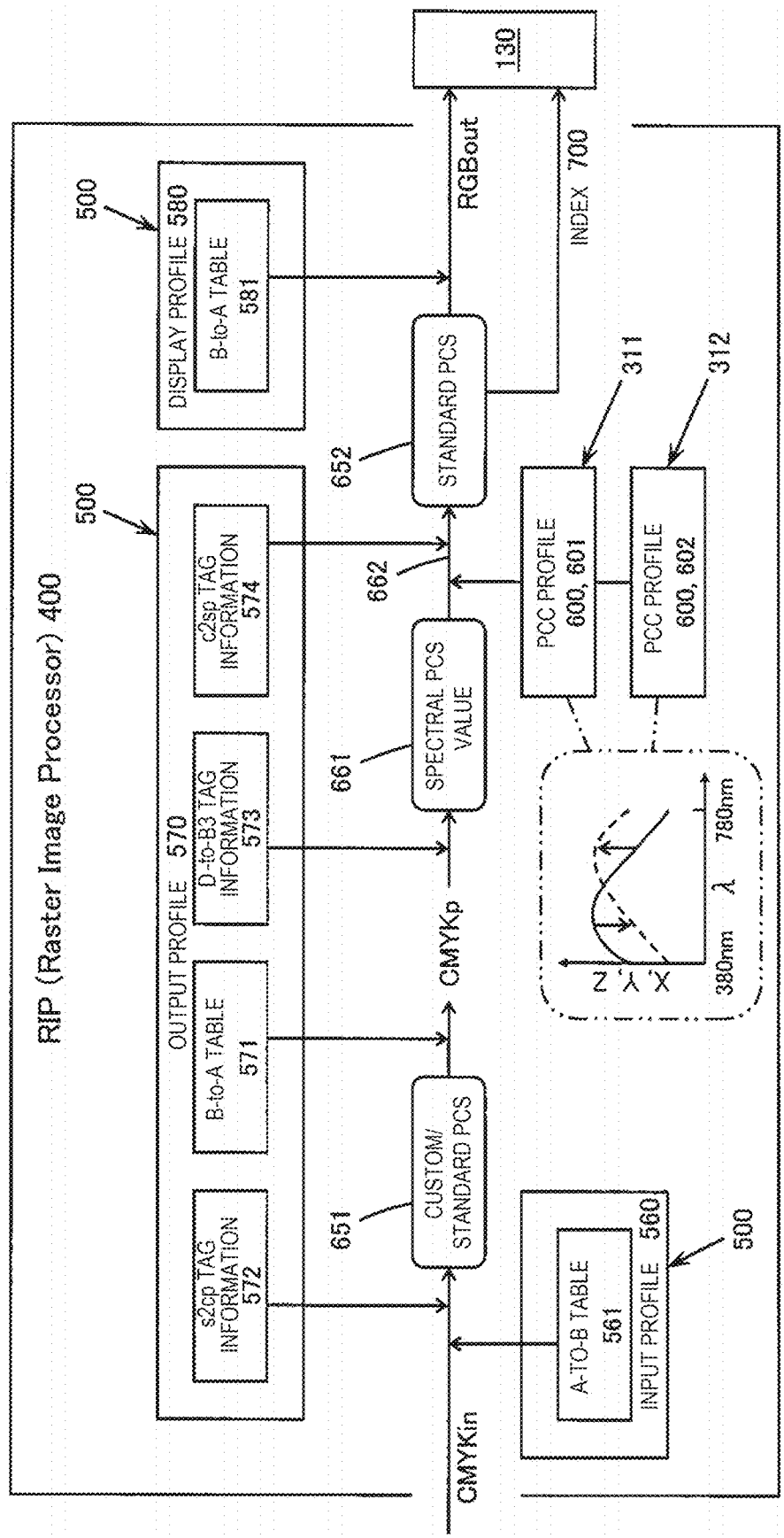
FIG. 2 schematically shows an example of a color management flow.

In the color management system shown in FIG. 2, a RIP 400 implemented by the information processing device 100 can convert an input color CMYKin of each pixel of an input image into a print color CMYKp or into a display color RGBout. RIP is an abbreviation of raster image processor. R of RGB means red. G of RGB means green. B of RGB means blue. The input color CMYKin represents a process color for reproducing a target color with the C, M, Y, and K color materials of a target printing machine which is a color matching target device. The target color is expressed, for example, by a color value XYZ in the XYZ color space or a color value Lab in the Lab color space. In this specific example, the RIP 400 can output the index 700 indicating the difference in the appearance between a plurality of different output images according to the viewing condition, to the display device 130.

The RIP 400 shown in FIG. 2 uses the color conversion profile 500 and the PCC profile 600 in order to perform various kinds of conversion processing. For these profiles (500, 600), for example, the data format of an ICC profile can be used.

The input profile 560 included in the color conversion profile 500 is a file describing a color characteristic of a color material used in the target printing machine. The input profile 560 shown in FIG. 2 includes at least an A-to-B table 561, which is a color conversion table for converting the input color CMYKin into a color value in a PCS. PCS is an abbreviation of profile connection space. The PCS is a color space for connecting an input and an output to each other at the time of the input and the output in color conversion. As the color value in the PCS, for example, a color value XYZ or a color value Lab is used.

The output profile 570 included in the color conversion profile 500 is a file describing a color characteristic of an ink used in the printer 200. The output profile 570 in this specific example is assumed to be a color conversion profile corresponding to the ICC profile version 5. The output profile 570 shown in FIG. 2 includes at least a B-to-A table 571, which is a color conversion table for converting a color value in a PCS 651 into the print color CMYKp, s2cp tag information 572, D-to-B3 tag information 573, and c2sp tag information 574. Here, s2cp tag is an abbreviation of standard-to-custom Pcc tag and c2sp tag is an abbreviation of custom-to-standard Pcc tag.

The display profile 580 included in the color conversion profile 500 is a file describing a color characteristic of the display device 130. The display profile 580 shown in FIG. 2 includes at least a B-to-A table 581, which is a color conversion table for converting a color value in a standard PCS 652 into the display color RGBout. The standard PCS 652 is a PCS under a standard viewing condition of a reference D50 light source and a 2-degree field of view.

The PCC is profile information including a condition for converting color information between the standard viewing condition of the D50 light source and the 2-degree field of view and an actual viewing condition used in the color conversion of the profile, according to the ICC profile version 5. The PCC profile 600 includes spectral information representing the correspondence relationship between the standard viewing condition and the actual viewing condition. The spectral information is expressed, for example, every 5 nm from 380 nm to 780 nm. It can be said that the PCC profile 600 includes spectral information for converting from the standard viewing condition to the actual viewing condition and spectral information for converting from the actual viewing condition to the standard viewing condition. In this specific example, the PCC profiles 601, 602, . . . having different spectral information from each other are used. Thus, a metamerism simulation can be executed without changing the output profile 570. The PCC profile 601 is an example of the first profile including the first spectral information 311 corresponding to the first viewing condition. The PCC profile 602 is an example of the second profile including the second spectral information 312 corresponding to the second viewing condition.

The RIP 400 can also use an input profile for converting between an input color (CMYin) expressing the amount of color materials used of only the three primary colors CMY, which represents a subtractive color mixture, an input color (RGBin) expressing the intensity of the three primary colors RGB, which represents an additive color mixture, or the like, other than the input color CMYKin, and a color value in the device-independent color space. Thus, the RIP 400 can also convert the input color CMYin, the input color RGBin or the like into the print color CMYKp via the PCS. Moreover, the RIP 400 can also directly take in a color value in the device-independent color space and convert the color value into the print color CMYKp.

Figure 3:
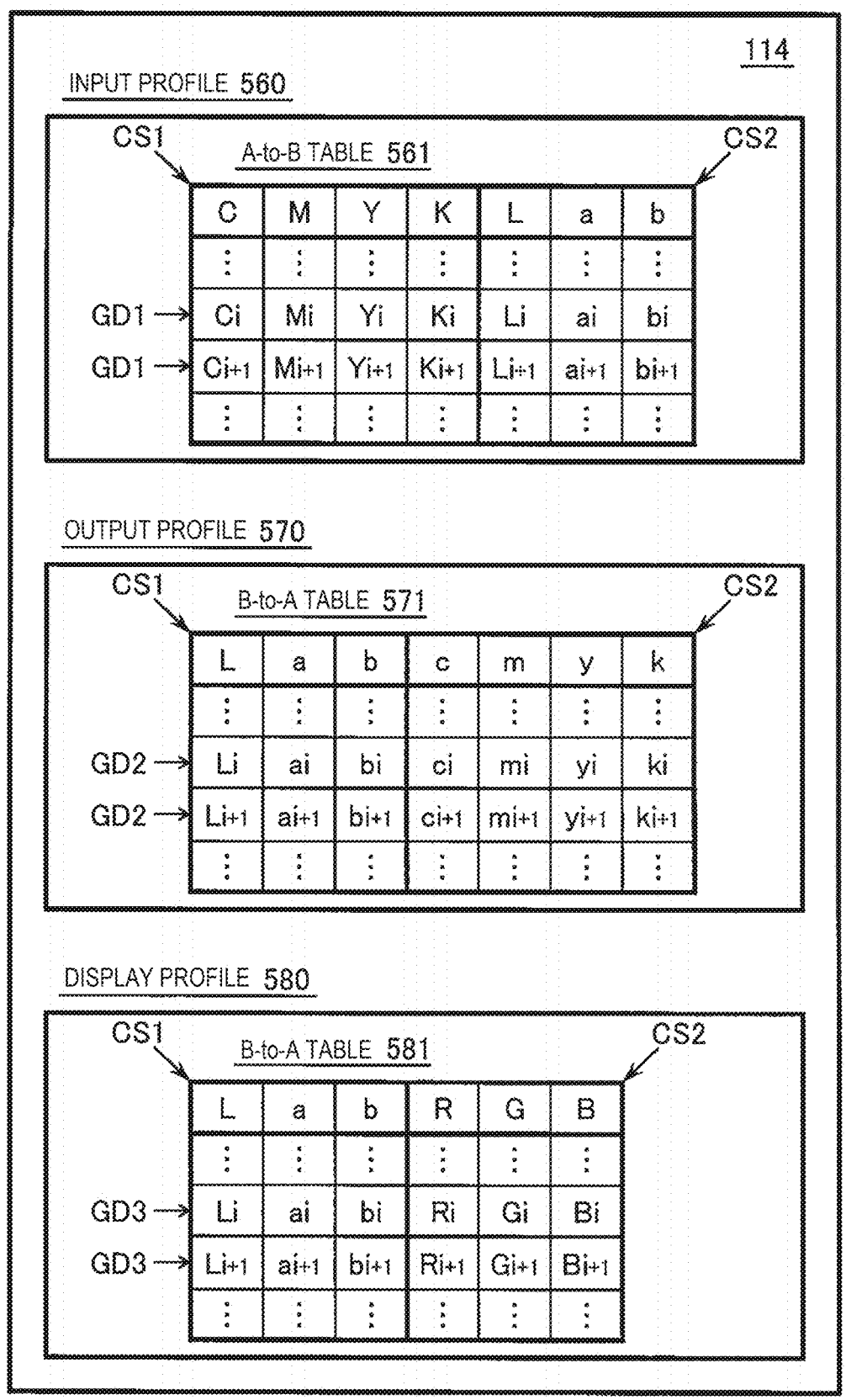
FIG. 3 schematically shows an example of the structure of a color conversion table.

First, an example of the structures of the A-to-B table 561 and the B-to-A tables 571, 581 will be described with reference to FIG. 3. The storage device 114 stores the input profile 560 including the A-to-B table 561, the output profile 570 including the B-to-A table 571, and the display profile 580 including the B-to-A table 581.

The A-to-B table 561 is data prescribing the correspondence relationship between CMYK values ($C_i$, $M_i$, $Y_i$, $K_i$) in a CMYK color space, which is an input color space CS1, and Lab values ($L_i$, $a_i$, $b_i$) in a Lab color space, which is an output color space CS2. The variable i is a variable identifying a grid point GD1 set in the CMYK color space. The CMYK values correspond to the input color CMYKin. The grid points GD1 in the A-to-B table 561 are normally arranged substantially at an equal interval in a C-axis direction, an M-axis direction, a Y-axis direction, and a K-axis direction, in the CMYK color space.

The B-to-A table 571 is data prescribing the correspondence relationship between Lab values ($L_i$, $a_i$, $b_i$) in the Lab color space, which is an input color space CS1, and cmyk values ($c_i$, $m_i$, $y_i$, $k_i$) in a cmyk color space, which is an output color space CS2. The variable i is a variable identifying a grid point GD2 set in the Lab color space. The cmyk values correspond to the print color CMYKp. The "cmyk color space" is expressed in this way in order to distinguish the "cmyk color space" from the "CMYK color space" corresponding to the input color CMYKin. The grid points GD2 in the B-to-A table 571 are normally arranged substantially at an equal interval in an L-axis direction, an a-axis direction, and a b-axis direction, in the Lab color space.

The B-to-A table 581 is data prescribing the correspondence relationship between Lab values ($L_i$, $a_i$, $b_i$) in the Lab color space, which is an input color space CS1, and RGB values ($R_i$, $G_i$, $B_i$) in an RGB color space, which is an output color space CS2. The variable i is a variable identifying a grid point GD3 set in the Lab color space. The RGB values correspond to the display color RGBout. The grid points GD3 in the B-to-A table 581 are normally arranged substantially at an equal interval in the L-axis direction, the a-axis direction, and the b-axis direction, in the Lab color space.

A grid point means an imaginary point arranged in the input color space. It is assumed that an output coordinate value corresponding to the position of a grid point in the input color space is stored at this grid point. Not only an even arrangement of a plurality of grid points in the input color space but also an uneven arrangement of a plurality of grid points in the input color space is included in the present technique.

Figure 4:
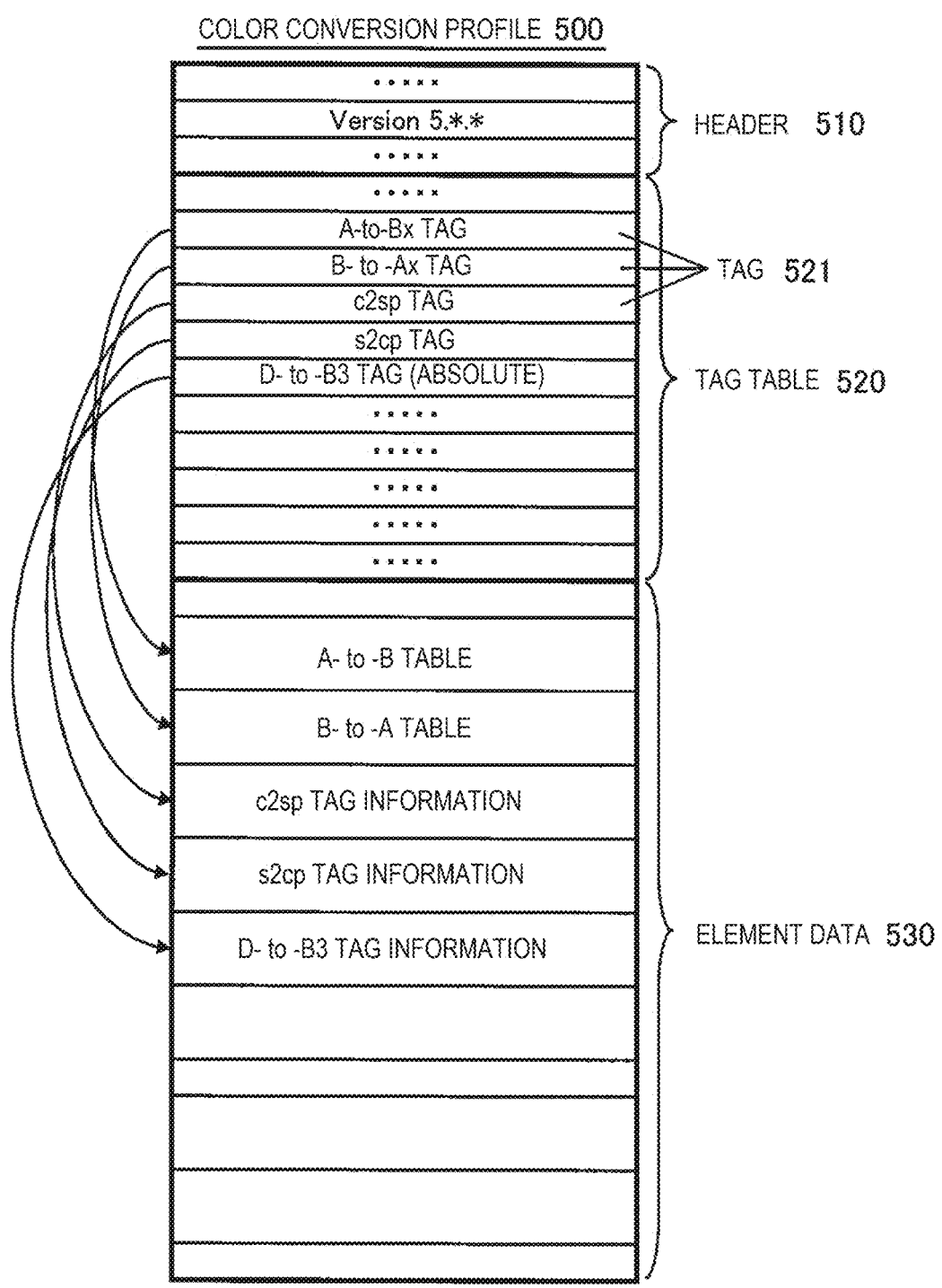
FIG. 4 schematically shows an example of the structure of a color conversion profile.

FIG. 4 schematically shows the structure of the color conversion profile 500. The color conversion profile 500 shown in FIG. 4 in conformity with the ICC profile version 5 and includes a header 510, a tag table 520, and element data 530.

The tag table 520 stores a plurality of tags 521, which are necessary information for converting color information between a device-dependent color space and a PCS. The plurality of tags 521 shown in FIG. 4 include an A-to-Bx tag, a B-to-Ax tag, a c2sp tag, an s2cp tag, a D-to-B3 tag, and the like. The "x" of the A-to-Bx tag and the B-to-Ax tag is "0" meaning perceptual color conversion, "1" meaning media-relative color conversion, "2" meaning saturation color conversion, or "3" meaning absolute color conversion. The c2sp tag is information linked to element data for converting from a PCS under a custom viewing condition to a PCS under a standard viewing condition, based on the PCC. The s2cp tag is information linked to element data for converting from the PCS under the standard viewing condition to the PCS under the custom viewing condition defined by the PCC. The D-to-B3 tag is information linked to element data for defining absolute color conversion from a device output value defined by the ICC profile version 5 to a spectral PCS. The spectral PCS is a PCS defined by spectral information defined by the ICC profile version 5.

The element data 530 includes an A-to-B table linked to the A-to-Bx tag, a B-to-A table linked to the B-to-Ax tag, c2sp tag information linked to the c2sp tag, s2cp tag information linked to the s2cp tag, D-to-B3 tag information linked to the D-to-B3 tag, and the like. The c2sp tag information includes information for converting from the PCS under the custom viewing condition to the PCS under the standard viewing condition, for example, matrix information. Therefore, when the c2sp tag is applied, processing of converting from the PCS under the custom viewing condition to the PCS under the standard viewing condition, for example, a matrix computation, is performed. The s2cp tag includes information for converting from the PCS under the standard viewing condition to the PCS under the custom viewing condition, for example, matrix information. Therefore, when s2cp tag is applied, processing of converting from the PCS under the standard viewing condition to the PCS under the custom viewing condition, for example, a matrix computation, is performed. The D-to-B3 tag information includes information for converting from a device output value to a spectral PCS value. When the D-to-B3 tag is applied, processing of converting from a device output value to a spectral PCS value is performed.

FIG. 5 schematically shows the structure of the PCC profile 600. As described above, the PCC profile 600 includes a condition for converting color information between the standard viewing condition of the D50 light source and the 2-degree field of view, and the actual viewing condition.

The PCC profile 600 includes the color-matching functions $x(\lambda)$, $y(\lambda)$, $z(\lambda)$ of the viewer and the spectral energy $P(\lambda)$ of the viewing light source, as spectral information corresponding to a plurality of levels of wavelength A. The color-matching functions $x(\lambda)$, $y(\lambda)$, $z(\lambda)$ vary according to the viewer. The spectral energy $P(\lambda)$ varies according to the viewing light source. These functions $x(\lambda)$, $y(\lambda)$, $z(\lambda)$, $P(\lambda)$ represent the viewing condition. The spectral information is stored as the first spectral information 311 in the PCC profile 601 and as the second spectral information 312 in the PCC profile 602.

The RIP 400 shown in FIG. 2 can convert the input color CMYKin into the color value XYZ, Lab in the standard PCS according to the A-to-B table 561 of the input profile 560. The RIP 400 can convert the color value XYZ, Lab in the standard PCS into the color value XYZ, Lab in the custom PCS (PCS 651 shown in FIG. 2) according to the s2cp tag information 572 of the output profile 570. For example, when the output profile 570 corresponds to the A light source and the 2-degree field of view, the PCS 651 is a custom PCS having a viewing condition of the A light source and the 2-degree field of view. The RIP 400 can convert the color value XYZ, Lab in the PCS 651 into the print color CMYKp according to the B-to-A table 571 and can generate print image data according to the print color CMYKp and cause the printer 200 to form a print image on a print substrate.

The information processing device 100 performs processing of separating the print color CMYKp into the amount of each ink used, according to need. For example, a Lc ink is assumed to be light cyan having a lower density than the C ink, and a Lm ink is assumed to be light magenta having a lower density than the M ink. In this case, the C value of the print color CMYKp is divided into the amount of the C ink used and the amount of the Lc ink used, and the M value of the print color CMYKp is divided into the amount of the M ink used and the amount of the Lm ink used. When the printer 200 uses a light black ink having a lower density than the K ink, a dark yellow ink having a higher density than the Y ink, or the like, separation processing is similarly performed. Also, when the printer 200 uses an orange ink, a green ink, or the like, separation processing can be similarly performed.

The RIP 400 can convert the print color CMYKp into a spectral PCS value 661 according to the D-to-B3 tag information 573 of the output profile 570. For example, when the output profile 570 corresponds to the spectral reflectance for the A light source and the 2-degree field of view, the spectral PCS value 661 is a spectral reflectance under the viewing condition of the A light source and the 2-degree field of view. The RIP 400 can convert the spectral PCS value 661 into a spectral PCS value 662 according to the PCC profile 600. For example, when the PCC profile 600 corresponds to the spectral reflectance for the F5 light source and the 10-degree field of view, the spectral PCS value 662 is a spectral reflectance reflecting the viewing condition of the F5 light source and the 10-degree field of view. Changing the PCC profile 600 according to the viewing condition provides the spectral PCS value 662 of the spectral reflectance reflecting various viewing conditions. For example, when the PCC profile 601 corresponds to the spectral reflectance for the D50 light source and the 2-degree field of view, the spectral PCS value 662 is a spectral reflectance reflecting the viewing condition of the D50 light source and the 2-degree field of view. When the PCC profile 602 corresponds to the spectral reflectance for the D65 light source and the 2-degree field of view, the spectral PCS value 662 is a spectral reflectance reflecting the viewing condition of the D65 light source and the 2-degree field of view.

The RIP 400 can convert the spectral PCS value 662 into the color value XYZ, Lab in the standard PCS 652 according to the c2sp tag information 574 of the output profile 570. The RIP 400 can convert the color value XYZ, Lab in the standard PCS 652 into the display color RGBout according to the B-to-A table 581 of the display profile 580, and can generate display information including an output image according to the display color RGBout and cause the display device 130 to display the output image. The output image reflects the viewing condition represented by the PCC profile 600. Therefore, the user can visually recognize the output image reflecting the viewing condition.

The RIP 400 acquires a color value Lab in the standard PCS 652 from the spectral PCS value 662 according to the plurality of different PCC profiles 601, 602 and thus can calculate the index 700 indicating the difference in the appearance between a plurality of different output images according to the viewing conditions. The RIP 400 can generate display information including the index 700 and cause the display device 130 to display the index 700. Thus, the user can objectively check the difference in the appearance of an image under a plurality of different viewing conditions.

FIG. 6 schematically shows an example of a profile group used for a metamerism simulation. The profile group shown in FIG. 6 is stored in the storage device 114.

For example, the input profile 560 with a name "IN1" has data representing the correspondence relationship between the input color CMYKin and the color value XYZ in the standard PCS of the XYZ color space corresponding to the D50 light source and the 2-degree field of view, according to the ICC profile version 2. Although not described in detail, the input profile 560 also incudes the ICC profile of version 5.

The output profile 570 with a name "OUT1" has data representing the correspondence relationship between the color value Lab in a custom PCS corresponding to the A light source and the 2-degree field of view, and the print color CMYKp, according to the ICC profile version 5. The spectral PCS stores a spectral reflectance. Although not described in detail, the output profile 570 includes profiles under various viewing conditions and also includes a profile in which the spectral PCS stores a spectral transmittance.

The display profile 580 with a name "DSP1" has data representing the correspondence relationship between the color value XYZ in the standard PCS corresponding to the D50 light source and the 2-degree field of view, and the display color RGBout, according to the ICC profile version 2.

The PCC profile 600 with a name "PCC1" includes spectral information corresponding to the D50 light source and the 2-degree field of view, according to the ICC profile version 5. The spectral PCS stores a spectral reflectance. The PCC profile 600 with a name "PCC2" includes spectral information corresponding to the D65 light source and the 2-degree field of view, according to the ICC profile version 5. The spectral PCS stores a spectral reflectance. The PCC profile 600 with a name "PCC3" includes spectral information corresponding to the F5 light source and a custom viewer, according to the ICC profile version 5. The PCC profile 600 with a name "PCC4" includes spectral information corresponding to the A light source and the 10-degree field of view, according to the ICC profile version 5. Although not described in detail, the PCC profile 600 includes profiles under various viewing conditions and also includes a profile in which the spectral PCS stores a spectral transmittance. FIG. 6 shows that the PCC profile 601 including the first spectral information 311 is applied to the PCC profile 600 with the name "PCC1" and that the PCC profile 602 including the second spectral information 312 is applied to the PCC profile 600 with the name "PCC2". The PCC profiles 601, 602 are not limited to being selected from the profile group stored in advance in the storage device 114 and may be generated by accepting an input of spectral information.

(5) SPECIFIC EXAMPLE OF PROCESSING PERFORMED BY INFORMATION PROCESSING DEVICE

FIGS. 7 and 8 schematically show an example of color conversion processing performed by the information processing device 100. FIG. 9 schematically shows an example of the color conversion processing performed by the information processing device 100, in the form of a block diagram. The processing shown in FIGS. 7 and 8 starts when a user operation to execute printing based on the image data DA0 is accepted at the input device 115. Step S102 corresponds to the image data input unit U1, the image data input function FU1, and the image data input step ST1. Step S106 corresponds to the viewing condition setting acceptance unit U2, the viewing condition setting acceptance function FU2, and the viewing condition setting acceptance step ST2. Steps S108 to S112 correspond to the color conversion unit U3, the color conversion function FU3, and the color conversion step ST3. Steps S114 to 116 correspond to the display information generation unit U4, the display information generation function FU4, and the display step ST4. Step S152 corresponds to the processing setting acceptance unit U5, the processing setting acceptance function FU5, and the processing setting acceptance step ST5. Steps S124 and S154 to S162 correspond to the print image data generation unit U6, the print image data generation function FU6, and the print image data generation step ST6. Hereinafter, the term "step" may be omitted with a step number given in parentheses.

As the color conversion processing shown in FIG. 7 starts, the information processing device 100 accepts an input of the image data DA0 representing the image IM0 (see FIG. 9) (S102). The processing of S102 can be implemented, for example, as the processing of accepting a selection of a file including the image data DA0 at the input device 115.

Figure 10:
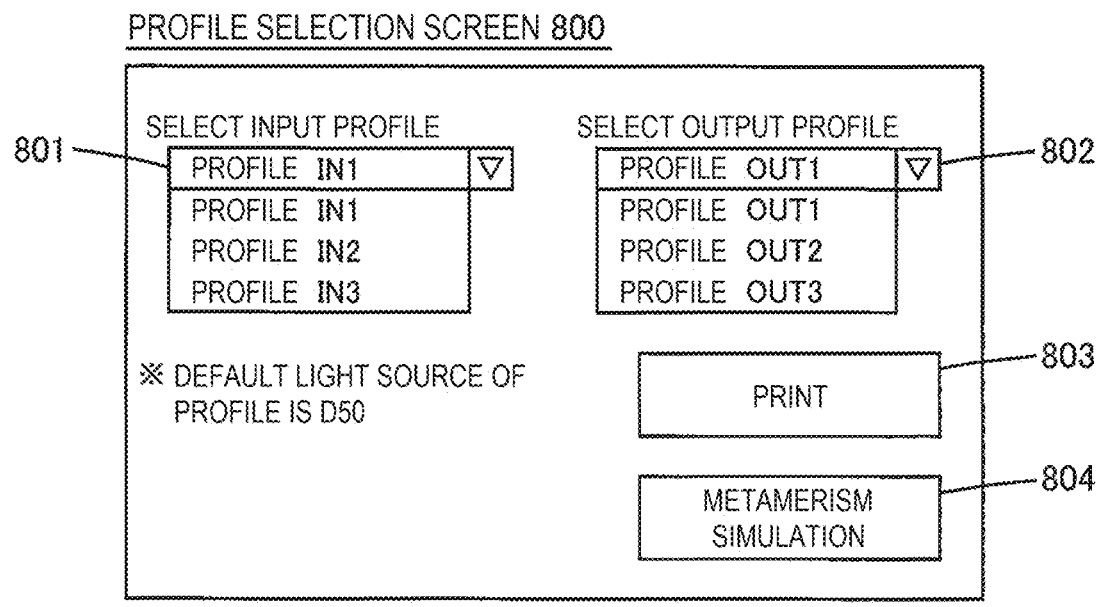
FIG. 10 schematically shows an example of a profile selection screen.

The information processing device 100 also causes the display device 130 to display a profile selection screen 800 illustrated in FIG. 10 and accepts a setting of the input profile 560 and the output profile 570 (S104).

FIG. 10 schematically shows an example of the profile selection screen 800. The profile selection screen 800 has an input profile selection field 801, an output profile selection field 802, a print button 803, and a metamerism simulation button 804. The information processing device 100 accepts an operation of selecting one input profile from among a plurality of input profiles 560 in the input profile selection field 801. The information processing device 100 accepts an operation of selecting one output profile from among a plurality of output profiles 570 in the output profile selection field 802. When the information processing device 100 has accepted an operation on the print button 803, the information processing device 100 advances the processing to S124, though not illustrated. In this case, the information processing device 100 causes the printer 200 to print the print image IM3 in the print color CMYKp acquired by color conversion via the input profile 560 selected in the input profile selection field 801 and the output profile 570 selected in the output profile selection field 802.

When the information processing device 100 has accepted an operation on the metamerism simulation button 804, the information processing device 100 advances the processing to S106, causes the display device 130 to display a metamerism simulation setting screen 810 illustrated in FIG. 11, and accepts a setting of a viewing condition for the image IM0.

FIG. 11 schematically shows an example of the metamerism simulation setting screen 810. The metamerism simulation setting screen 810 has a print checking environment selection field 811, a print presentation environment selection field 812, and a simulation execution button 814. The "print checking environment" means the environment where the printer 200 is installed, and means the environment where the user checks the color of the print image IM3 immediately after the print image IM3 is formed. The "print checking environment" is an example of the first viewing condition 301 for the image IM0. The "print presentation environment" means the environment where a printed object having the print image IM3 is presented. The "print presentation environment" is an example of the second viewing condition 302 for the image IM0.

The first viewing condition 301 and the second viewing condition 302 are decided in relative terms. Therefore, the "print presentation environment" may be applied to the first viewing condition 301 and the "print checking environment" may be applied to the second viewing condition 302.

The information processing device 100 accepts a selection of one viewing light source from among a plurality of viewing light sources in the print checking environment selection field 811. The print checking environment selection field 811 may include the condition of the viewer. The plurality of viewing light sources included in the print checking environment selection field 811 correspond to different PCC profiles 600 from each other. Thus, the information processing device 100 accepts a setting of the first viewing condition 301 in the print checking environment selection field 811.

The information processing device 100 accepts a selection of one viewing light source from among a plurality of viewing light sources in the print presentation environment selection field 812. The print presentation environment selection field 812 may include the condition of the viewer. The plurality of viewing light sources included in the print presentation environment selection field 812 correspond to different PCC profiles 600 from each other. Thus, the information processing device 100 accepts a setting of the second viewing condition 302 in the print presentation environment selection field 812. The print presentation environment selection field 812 includes a "viewing light source take-in" item 813. When the "viewing light source take-in" item 813 is selected, the information processing device 100 accepts, for example, an input of a PCC profile including custom spectral information. This PCC profile is handled as the PCC profile 602 including the second spectral information 312. When the "viewing light source take-in" item 813 is selected, the information processing device 100 may accept an input of custom second spectral information 312 and generate a new PCC profile 602 including the custom second spectral information 312. The custom second spectral information 312 may be acquired by the color measurement device 120 shown in FIG. 1.

The print checking environment selection field 811, too, may include a "viewing light source take-in" item. In this case, when the "viewing light source take-in" item is selected, the information processing device 100 may accept an input of a PCC profile including custom spectral information. This PCC profile is handled as the PCC profile 601 including the first spectral information 311. When the "viewing light source take-in" item is selected, the information processing device 100 may accept an input of custom first spectral information 311 and generate a new PCC profile 601 including the custom first spectral information 311.

When the information processing device 100 has accepted an operation on the simulation execution button 814, the information processing device 100 advances the processing to S108 and calculates a color value Lab1(j) of each pixel j in the first output image IM1 (see FIG. 9) in the print checking environment. In S110, the information processing device 100 calculates a color value Lab2(j) of each pixel j in the second output image IM2 (see FIG. 9) in the print presentation environment. The processing of S108 and S110 can be performed, for example, in the following manner.

To describe the processing with reference to FIG. 2, the information processing device 100 first converts the input color CMYKin of the image IM0 into the color value XYZ or Lab in the standard PCS according to the A-to-B table 561 of the selected input profile 560. The information processing device 100 then converts the color value XYZ or Lab in the standard PCS into the color value XYZ or Lab in the PCS 651 according to the s2cp tag information 572 of the selected output profile 570. For example, when the output profile 570 corresponds to the A light source and the 2-degree field of view, the PCS 651 is a custom PCS for the A light source and the 2-degree field of view. The information processing device 100 then converts the color value XYZ or Lab in the PCS 651 into the print color CMYKp according to the B-to-A table 571 of the selected output profile 570. The information processing device 100 then converts the print color CMYKp into the spectral PCS value 661 according to the D-to-B3 tag information 573 of the selected output profile 570. For example, when the output profile 570 corresponds to the spectral reflectance for the A light source and the 2-degree field of view, the spectral PCS value 661 is the spectral reflectance for the A light source and the 2-degree field of view.

In S108, the information processing device 100 converts the spectral PCS value 661 into the spectral PCS value 662 according to the PCC profile 601 that is set. For example, when the PCC profile 601 corresponds to the spectral reflectance for the D50 light source and the 2-degree field of view, the spectral PCS value 662 is the spectral reflectance reflecting the first viewing condition 301 of the D50 light source and the 2-degree field of view. The information processing device 100 then converts the spectral PCS value 662 into the color value Lab1(j) in the standard PCS 652 according to the c2sp tag information 574 of the selected output profile 570. Therefore, the color value Lab1(j) reflects the first viewing condition 301.

In S110, the information processing device 100 converts the spectral PCS value 661 into the spectral PCS value 662 according to the PCC profile 602 that is set. For example, when the PCC profile 602 corresponds to the spectral reflectance for the D65 light source and the 2-degree field of view, the spectral PCS value 662 is the spectral reflectance reflecting the second viewing condition 302 of the D65 light source and the 2-degree field of view. The information processing device 100 then converts the spectral PCS value 662 into the color value Lab2(j) in the standard PCS 652 according to the c2sp tag information 574 of the selected output profile 570. Therefore, the color value Lab2(j) reflects the second viewing condition 302.

After calculating the color values Lab1(j), Lab2(j), the information processing device 100 generates the first output image data DA1 representing the first output image IM1 adjusted to the appearance in the print checking environment and the second output image data DA2 representing the second output image IM2 adjusted to the appearance in the print presentation environment (S112). For example, the information processing device 100 converts the color value Lab1(j) in the standard PCS 652 into the display color RGBout according to the B-to-A table 581 of the display profile 580 and thus can generate the first output image data DA1. Also, the information processing device 100 converts the color value Lab2(j) in the standard PCS 652 into the display color RGBout according to the B-to-A table 581 of the display profile 580 and thus can generate the second output image data DA2.

In this way, the information processing device 100 converts the image data DA0 into the first output image data DA1 representing the first output image IM1 adjusted to the appearance under the first viewing condition 301, based on the PCC profile 601 including the first spectral information 311 corresponding to the first viewing condition 301. The information processing device 100 also converts the image data DA0 into the second output image data DA2 representing the second output image IM2 adjusted to the appearance under the second viewing condition 302, based on the PCC profile 602 including the second spectral information 312 corresponding to the second viewing condition 302.

After the processing of S112, the information processing device 100 calculates the index 700 indicating the difference in the appearance between the first output image IM1 and the second output image IM2 (S114). The information processing device 100 in this specific example calculates an average value Avg_$\Delta$E, a maximum value Max $\Delta$E, a variance value $\sigma^2$_$\Delta$E, and a standard deviation value $\sigma$_$\Delta$E, as the index 700. The average value Avg_$\Delta$E is the average value, preferably the arithmetic mean value, of the color difference of each pixel between the first output image IM1 and the second output image IM2. The maximum value Max $\Delta$E is the maximum value of the color difference of each pixel between first output image IM1 and the second output image IM2. The color difference is assumed to be the color difference $\Delta E_{00}$ expressed by the CIE DE 2000 color difference formula but may also be the color difference $\Delta E^*_{94}$ expressed by the CIE 1994 color difference formula, the color difference $\Delta E^*ab$ based on the CIE L*a*b* color system proposed in 1976 (so-called $\Delta E^*_{76}$), the color difference $\Delta E^*_{uv}$ based on the CIE L*u*v* color system, or the like. The information processing device 100 calculates the color difference $\Delta E_{00}$ of each pixel, extracts the maximum value Max_$\Delta E$ of these color differences $\Delta E_{00}$, and specifies a maximum-color-difference site having the maximum color difference of each pixel between the first output image IM1 and the second output image IM2. Thus, the information processing device 100 specifies the maximum-color-difference site, based on the color value Lab1(j) corresponding to the first output image IM1 and the color value Lab2(j) corresponding to the second output image IM2.

The variance value $\sigma^2$_$\Delta E$ is the variance value of the color difference of each pixel between the first output image IM1 and the second output image IM2. The standard deviation value $\sigma$_$\Delta E$ is the standard deviation value of the color difference of each pixel between the first output image IM1 and the second output image IM2. The information processing device 100 calculates the variance value $\sigma^2$_$\Delta E$ from the color difference $\Delta E_{00}$ of each pixel and the average value Avg_$\Delta E$ and calculates the standard deviation value $\sigma$_$\Delta E$ from the variance value $\sigma^2$_$\Delta E$.

The average value Avg_$\Delta E$ may be the average value of the color difference of each part between the first output image IM1 and the second output image IM2, each part being a group of pixels within a predetermined range such as 2×2 pixels. Similarly, the maximum value Max_$\Delta E$ may be the maximum value of the color difference of each part between the first output image IM1 and the second output image IM2, each part being a group of pixels within a predetermined range. Similarly, the variance value $\sigma^2$_$\Delta E$ may be the variance value of the color difference of each part between the first output image IM1 and the second output image IM2, each part being a group of pixels within a predetermined range. Also, the standard deviation value $\sigma$_$\Delta E$ may be the standard deviation value of the color difference of each part between the first output image IM1 and the second output image IM2, each part being a group of pixels within a predetermined range.

Of the average value Avg_$\Delta E$, the maximum value Max_$\Delta E$, the variance value $\sigma^2$_$\Delta E$, and the standard deviation value $\sigma$_$\Delta E$, a value that is not displayed may be not calculated.

In this way, the information processing device 100 calculates the index 700 indicating the difference in the appearance between the first output image IM1 and the second output image IM2, based on the color value Lab1(j) corresponding to the first output image IM1 and the color value Lab2(j) corresponding to the second output image IM2.

Figure 12:
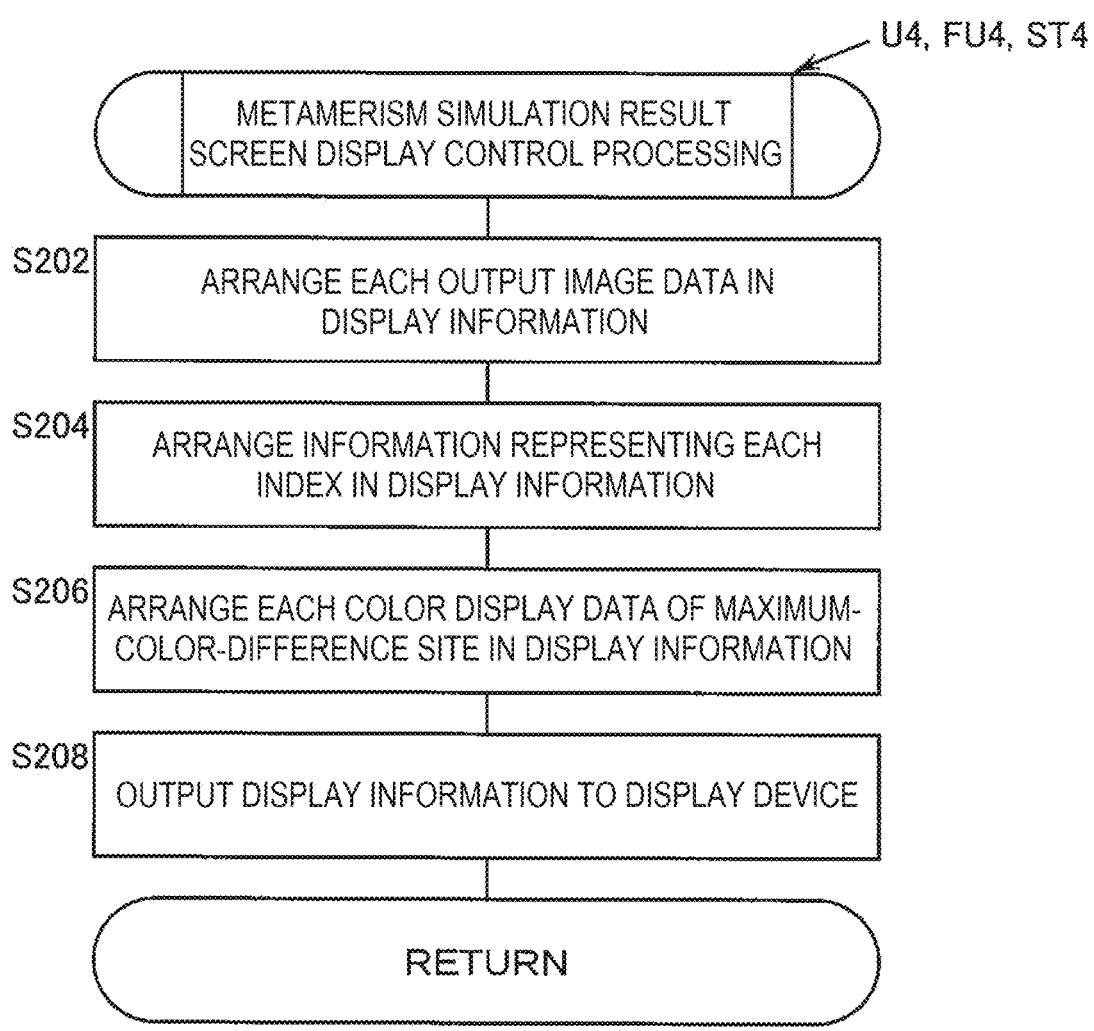
FIG. 12 is a flowchart schematically showing an example of metamerism simulation result screen display control processing performed by the information processing device.

After calculating the index 700, the information processing device 100 performs metamerism simulation result screen display control processing illustrated in FIG. 12 and causes the display device 130 to display a metamerism simulation result screen 820 illustrated in FIG. 13 (S116).

FIG. 12 schematically shows an example of the metamerism simulation result screen display control processing performed by the information processing device 100. FIG. 13 schematically shows the metamerism simulation result screen 820, which is an example of the display screen SC1.

As the metamerism simulation result screen display control processing starts, the information processing device 100 arranges the first output image data DA1 and the second output image data DA2 at a set site in the display information IN1 (see FIG. 9) (S202). The information processing device 100 also arranges information representing each index 700, specifically information representing the average value Avg_$\Delta E$, information representing the maximum value Max_$\Delta E$, information representing the variance value $\sigma^2$_$\Delta E$, and information representing the standard deviation value $\sigma$_$\Delta E$, at a set site in the display information IN1 (S204). Of the information representing the average value Avg_$\Delta E$, the information representing the maximum value Max_$\Delta E$, the information representing the variance value $\sigma^2$_$\Delta E$, and the information representing the standard deviation value $\sigma$_$\Delta E$, an index that is not displayed is not arranged in the display information IN1. The information processing device 100 also arranges color display data representing the color C1 of the first output image IM1 at the maximum-color-difference site and color display data representing the color C2 of the second output image IM2 at the maximum-color-difference site, at a set site in the display information IN1 (S206).

In this way, the information processing device 100 generates the display information IN1 representing the display screen SC1 including display areas for the first output image IM1, the second output image IM2, the information representing the index 700, and the colors C1, C2 of the maximum-color-difference site.

Finally, the information processing device 100 outputs the display information IN1 to the display device 130 and thus causes the display device 130 to display the metamerism simulation result screen 820 as shown in FIG. 13 (S208) and then ends the metamerism simulation result screen display control processing. The metamerism simulation result screen 820 has display areas for the first output image IM1 adjusted to the appearance under the first viewing condition 301, the second output image IM2 adjusted to the appearance under the second viewing condition 302, the information representing the index 700, and the colors C1, C2 of the maximum-color-difference site, and a print button 821. In FIG. 13, the information representing the average value Avg_$\Delta E$, the information representing the maximum value Max_$\Delta E$, the information representing the variance value $\sigma^2$_$\Delta E$, and the information representing the standard deviation value $\sigma$_$\Delta E$ are shown as the information representing the index 700. A part of these pieces of information may be not displayed.

The user views the first output image IM1 and the second output image IM2 displayed next to each other and thus can check the difference the way the image IM0 looks under the first viewing condition 301 and the second viewing condition 302. Thus, the user can check the difference in the way an image looks under a plurality of different viewing conditions without viewing a printed object under the viewing conditions. The user also views the index 700 indicating the difference in the appearance of the image IM0 under the plurality of different viewing conditions and thus can objectively check the difference in the appearance of the image IM0 under the plurality of different viewing conditions. The user also views the colors C1, C2 of the maximum-color-difference site and thus can easily check the difference in the way the image IM0 looks under the plurality of difference viewing conditions.

When the metamerism simulation result screen display control processing has ended, the information processing device 100 determines whether the index 700 exceeds a predetermined threshold or not (S118 in FIG. 7). For example, if the threshold of the average value Avg_$\Delta E$ is Tavg, the information processing device 100 may determine whether Avg_$\Delta E$>Tavg or not. The threshold Tavg is not particularly limited. However, for example, 0<Tavg≤4 can be employed. If the threshold of the maximum value Max_ΔE is Tmax, the information processing device 100 may determine whether Max_ΔE>Tmax or not. The threshold Tmax is not particularly limited. However, for example, 0<Tmax≤6 can be employed.

Figure 14:
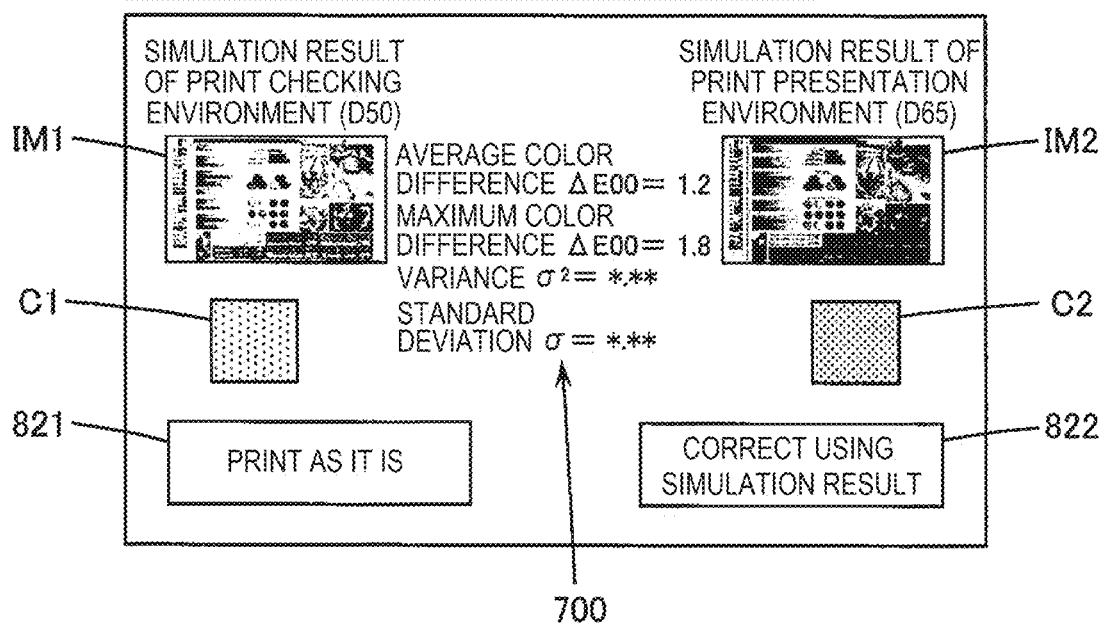
FIG. 14 schematically shows an example of the metamerism simulation result screen.

When the index 700 exceeds the threshold, the information processing device 100 adds a correction button 822 to the metamerism simulation result screen 820 as illustrated in FIG. 14 (S120) and advances the processing to S122. In S120, the information processing device 100 may add a warning area showing a warning that the index 700 exceeds the threshold, for example, "the average color difference $\Delta E_{00}$ exceeds the upper limit" or the like, to the metamerism simulation result screen 820.

When the index 700 does not exceed the threshold, the information processing device 100 advances the processing to S122 without executing the processing of S120.

In S122, the information processing device 100 branches the processing in response to an operation on the buttons included in the metamerism simulation result screen 820 shown in FIGS. 13 and 14.

When the information processing device 100 has accepted an operation on the print button 821 included in the metamerism simulation result screen 820 via the input device 115, the information processing device 100 advances the processing to S124. In this case, the information processing device 100 causes the printer 200 to print the print image IM3 in the print color CMYKp acquired by color conversion via the selected input profile 560 and the selected output profile 570.

When the information processing device 100 has accepted an operation on the correction button 822 included in the metamerism simulation result screen 820 via the input device 115, the information processing device 100 advances the processing to S152 in FIG. 8. In S152, the information processing device 100 causes the display device 130 to display a correction algorithm selection screen 830 illustrated in FIG. 15.

Figure 15:
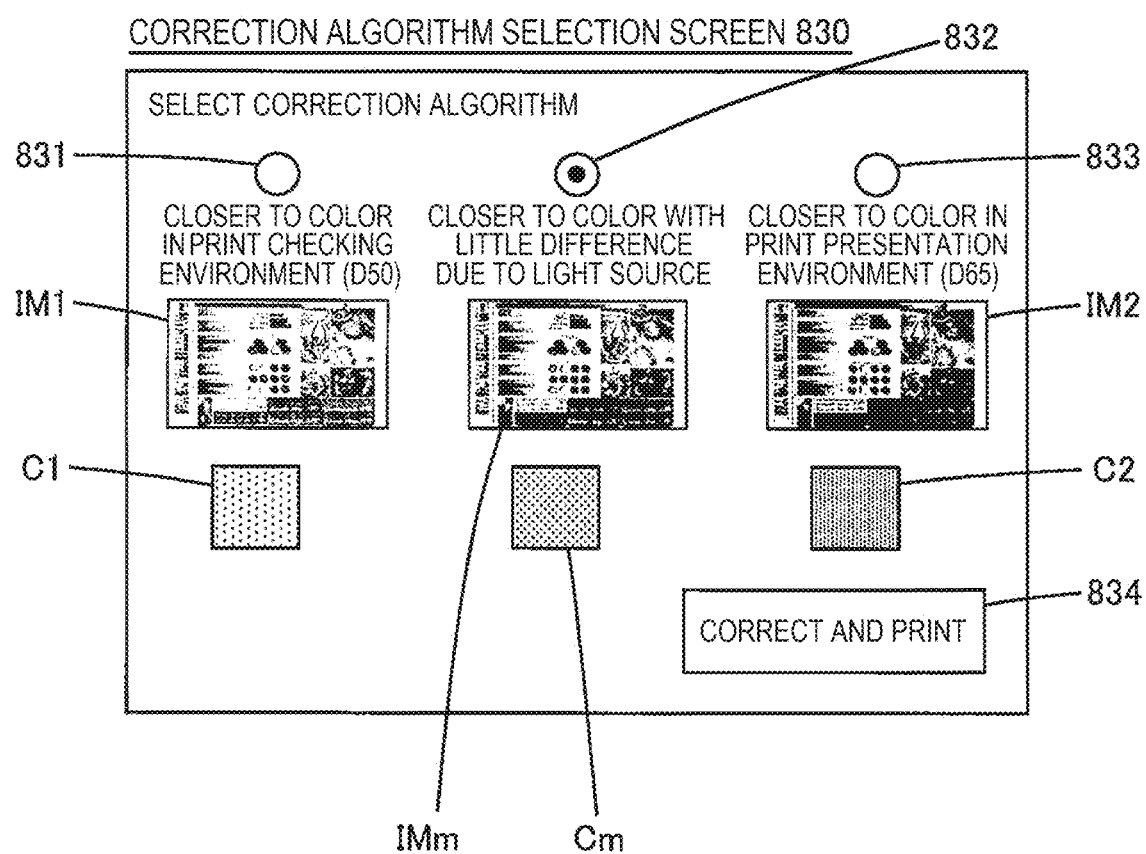
FIG. 15 schematically shows an example of a correction algorithm selection screen.

FIG. 15 schematically shows an example of the correction algorithm selection screen 830. The correction algorithm selection screen 830 has a display area for the first output image IM1, a display area for the second output image IM2, a display area for an intermediate image IMm, display areas for the colors C1, C2 of the maximum-color-difference site, a display area for a color Cm of the intermediate image IMm at the maximum-color-difference site, radio buttons 831 to 833, and a "correct and print" button 834.

The intermediate image IMm can be in an intermediate color between the first output image IM1 and the second output image IM2. The average value of the color values Lab1(j), Lab 2(j), preferably the arithmetic mean value thereof, is now defined as a color value Labm(j). The information processing device 100 converts the color value Labm(j) into the display color RGBout according to the B-to-A table 581 of the display profile 580 and thus can generate intermediate image data representing the intermediate image IMm. The information processing device 100 arranges the intermediate image data at a set site in the display information and thus can cause the display device 130 to display the intermediate image IMm. The information processing device 100 also arranges color display data representing the color Cm of the intermediate image IMm at the maximum-color-difference site, at a set site in the display information, and thus can cause the display device 130 to display an area for the color Cm.

The information processing device 100 accepts an operation of selecting one of the radio buttons 831 to 833 via the input device 115. When the information processing device 100 has accepted an operation on the "correct and print" button 834 via the input device 115, the information processing device 100 branches the processing in response to an operation on the radio buttons 831 to 833 (S154 in FIG. 8). When the radio button 832 corresponding to the display area for the intermediate image IMm is selected, the information processing device 100 advances the processing to S156. In this case, the information processing device 100 executes the first processing 351 (see FIG. 9) of generating the print image data DA3 in such a way that the print image IM3 is expressed in a color between the first output image IM1 and the second output image IM2. When the radio button 831 corresponding to the display area for the first output image IM1 is selected, the information processing device 100 advances the processing to S158. In this case, the information processing device 100 executes the second processing 352 (see FIG. 9) of generating the print image data DA3 in such a way that the print image IM3 is expressed in the color of the first output image IM1. When the radio button 833 corresponding to the display area for the second output image IM2 is selected, the information processing device 100 advances the processing to S160. In this case, the information processing device 100 executes the third processing 353 (see FIG. 9) of generating the print image data DA3 in such a way that the print image IM3 is expressed in the color of the second output image IM2.

In this way, the information processing device 100 accepts a selection of processing to execute from among a plurality of types of processing of generating the print image data DA3 in such a way that the print image IM3 is expressed in a color in a range from the color of the first output image IM1 to the color of the second output image IM2.

In S156, the information processing device 100 performs correction processing to reduce the index 700 indicating the difference in the appearance between the first output image IM1 and the second output image IM2. Subsequently, the information processing device 100 returns the processing to S108 in FIG. 7. Thus, the first processing 351 is performed in S156 and S108 to S124. The correction processing may be performed on the color value corresponding to the input color CMYKin, the selected output profile 570, or the selected input profile 560, as the processing target.

The correction processing on the color value corresponding to the input color CMYKin as the processing target can be performed, for example, in the following manner.

With respect to a pixel where the index 700 exceeds the threshold, of all the pixels j of the image IM0, the correction processing can be the processing of replacing the color value Lab corresponding to the input color CMYKin with the average value Labm(j) of the color values Lab1(j), Lab2(j). As for a pixel where the index 700 does not exceed the threshold, the color value corresponding to the input color CMYKin is not replaced. In the processing of S124 to be performed later, the information processing device 100 may perform the processing of converting the input color CMYKin into the color value Lab according to the A-to-B table 561 of the selected input profile 560 and subsequently replacing the color value of a pixel j where the index 700 exceeds the threshold, with the average value Labm(j). In this case, the information processing device 100 converts the color value into the print color CMYKp according to the B-to-A table 571 of the selected output profile 570 and causes the printer 200 to print the print image IM3 in the print color CMYKp. The resulting print image IM3 is adjusted as much as possible to both the appearance under the first viewing condition 301 and the appearance under the second viewing condition 302.

The correction processing on the output profile 570 as the processing target can be performed, for example, in the following manner.

First, the information processing device 100 acquires a print color corresponding to the average value Labm(j) according to the B-to-A table 571 of the output profile 570 before the correction. This print color is defined as CMYKm (j). The information processing device 100 then establishes a correspondence between the color value Lab corresponding to the input color CMYKin and CMYKm(j) and thus generates a new B-to-A table 571. In the processing of S124 to be performed later, the information processing device 100 may convert the input color CMYKin into the color value Lab according to the A-to-B table 561 of the selected input profile 560 and convert the color value Lab into a new print color CMYKp according to the new B-to-A table 571. In this case, the information processing device 100 causes the printer 200 to print the print image IM3 in the new print color CMYKp. Of course, the resulting print image IM3 is adjusted as much as possible to both the appearance under the first viewing condition 301 and the appearance under the second viewing condition 302.

The correction processing on the input profile 560 as the processing target can be, for example, the processing of generating a new A-to-B table 561 in such a way that the output value of the A-to-B table 561 of the input profile 560 is replaced with the average value Labm(j). The resulting print image IM3 is adjusted as much as possible to both the appearance under the first viewing condition 301 and the appearance under the second viewing condition 302.

In S158, the information processing device 100 performs the second processing 352 of generating the print image data DA3 in such a way that the print image IM3 is expressed in the color of the first output image IM1 adjusted to the print checking environment. For example, the information processing device 100 may convert the color value Lab1(j) into a print color according to the B-to-A table 571 of the selected output profile 570 and thus generate the print image data DA3. The information processing device 100 then transmits the print image data DA3 to the printer 200, thus causes the printer 200 to form the print image IM3 expressed in the color of the first output image IM1 (S162), and ends the color conversion processing. The resulting print image IM3 is adjusted to the appearance under the first viewing condition 301.

In S160, the information processing device 100 performs the third processing 353 of generating the print image data DA3 in such a way that the print image IM3 is expressed in the color of the second output image IM2 adjusted to the print presentation environment. For example, the information processing device 100 may convert the color value Lab2(j) into a print color according to the B-to-A table 571 of the selected output profile 570 and thus generate the print image data DA3. The information processing device 100 then transmits the print image data DA3 to the printer 200, thus causes the printer 200 to form the print image IM3 expressed in the color of the second output image IM2 (S162), and ends the color conversion processing. The resulting print image IM3 is adjusted to the appearance under the second viewing condition 302.

As described above, since the first output image IM1 and the second output image IM2 are displayed next to each other as shown in FIG. 13, the user can check the difference in the way an image looks under a plurality of different viewing conditions, without viewing a printed object under the viewing conditions. As the simulation using the PCC profile 600 is performed before printing, a light source device for a viewing light source need not be purchased and a color measurement device need not be purchased. Also, because of the simulation using the PCC profile 600, a media profile for each viewing condition need not be created and a highly accurate simulation image that cannot be acquired simply by shifting a white point is displayed. Moreover, a simulation image in which the appearance of the color is adjusted to the viewing environment is displayed even when the actual viewing light source is different from the standard light source.

Since the index 700 indicating the difference in the appearance of the image IM0 under a plurality of different viewing conditions is displayed, the user can objectively check the difference in the appearance of the image IM0 under the plurality of different viewing conditions. Also, as the print image IM3 is expressed in a color between the first output image IM1 and the second output image IM2, the metamerism generated by the difference in the viewing condition is reduced.

(6) MODIFICATION EXAMPLES

Various modification examples of the present disclosure are conceivable.

For example, the printer is not limited to an inkjet printer and may be an electrophotographic printer such as a laser printer using a toner as a color material, a three-dimensional printer, and the like.

The foregoing processing can be suitably changed, for example, changing the order or the like. For example, in the processing shown in FIG. 7, the processing of S102 can be performed after the processing of either S104 or S106. The processing of S106 can be performed before the processing of either S102 or S104. The processing of S108 and the processing of S110 can be replaced with each other.

In the processing shown in FIG. 8, after the correction processing of S156, the information processing device 100 may in S162 cause the printer 200 to print the print image IM3 in the print color CMYKp after the correction processing, without returning the processing to S108. One of the processing of S158 and the processing of S160 may be omitted. When the processing of S158 is omitted, the display area for the first output image IM1, the display area for the color C1, and the radio button 831 may be omitted in the correction algorithm selection screen 830 shown in FIG. 15. When the processing of S160 is omitted, the display area for the second output image IM2, the display area for the color C1, and the radio button 833 may be omitted in the correction algorithm selection screen 830 shown in FIG. 15.

The metamerism simulation result screen 820 (see FIG. 14) may constantly have the correction button 822. In this case, when the information processing device 100 has accepted an operation on the correction button 822, the information processing device 100 may constantly perform the correction processing of S156.

In the metamerism simulation result screen 820, at least a part of the information representing the index 700, the display area for the color C1, and the display area for the color 2 may be omitted.

(7) CONCLUSION

As described above, according to various aspects of the present disclosure, a technique that enables the user to check the difference in the way an image looks under a plurality of different viewing conditions, without viewing a printed object under the viewing conditions, or the like, can be provided. Of course, even a technique made up of only the component elements according to an independent claim can achieve the foregoing basic effects and advantages.

Also, a configuration formed by replacing components disclosed in the foregoing examples with each other or combining the components together, a configuration formed by replacing components disclosed in the related-art technique and the foregoing examples with each other or combining the components together, and the like, can be implemented. The present disclosure includes these configurations and the like.

What is claimed is:

1. An information processing device comprising:
    an image data input unit accepting an input of image data representing an image;
    a viewing condition setting acceptance unit accepting a setting of a first viewing condition for the image and a second viewing condition for the image;
    a color conversion unit converting the image data into first output image data representing a first output image adjusted to an appearance under the first viewing condition, based on a first profile including first spectral information corresponding to the first viewing condition, and converting the image data into second output image data representing a second output image adjusted to an appearance under the second viewing condition, based on a second profile including second spectral information corresponding to the second viewing condition; and
    a display information generation unit generating display information representing a display screen including the first output image and the second output image, based on the first output image data and the second output image data.

2. The information processing device according to claim 1, further comprising:
    a print image data generation unit generating print image data representing a print image, wherein
    the print image data generation unit can generate the print image data in such a way that the print image is expressed in a color between the first output image and the second output image.

3. The information processing device according to claim 2, further comprising:
    a processing setting acceptance unit accepting a selection of processing to be executed by the print image data generation unit from among a plurality of types of processing of generating the print image data in such a way that the print image is expressed in a color in a range from a color of the first output image to a color of the second output image, wherein
    the print image data generation unit generates the print image data according to the processing selected by the processing setting acceptance unit.

4. The information processing device according to claim 3, wherein
    the plurality of types of processing include first processing of generating the print image data in such a way that the print image is expressed in a color between the first output image and the second output image, and
    the plurality of types of processing also includes at least one of second processing of generating the print image data in such a way that the print image is expressed in the color of the first output image, and third processing of generating the print image data in such a way that the print image is expressed in the color of the second output image.

5. The information processing device according to claim 1, wherein
    the display information generation unit calculates an index indicating a difference in the appearance between the first output image and the second output image, based on a color value corresponding to the first output image and a color value corresponding to the second output image, and generates the display information representing the display screen including the index.

6. The information processing device according to claim 5, wherein
    the index includes at least a part of an average value of a color difference per part between the first output image and the second output image, a maximum value of the color difference per part between the first output image and the second output image, a variance value of the color difference per part between the first output image and the second output image, and a standard deviation value of the color difference per part between the first output image and the second output image.

7. The information processing device according to claim 1, wherein
    the display information generation unit specifies a site having a maximum color difference per part between the first output image and the second output image, based on a color value corresponding to the first output image and a color value corresponding to the second output image, and generates the display information representing the display screen including a display area for a color of the first output image at the site and a display area for a color of the second output image at the site.

8. The information processing device according to claim 1, wherein
    the viewing condition setting acceptance unit can accept an input of the second spectral information, and
    the color conversion unit converts the image data into the second output image data, based on the second spectral information, when the input of the second spectral information is accepted.

9. A display method comprising:
    an image data input step of accepting an input of image data representing an image;
    a viewing condition setting acceptance step of accepting a setting of a first viewing condition for the image and a second viewing condition for the image;
    a color conversion step of converting the image data into first output image data representing a first output image adjusted to an appearance under the first viewing condition, based on a first profile including first spectral information corresponding to the first viewing condition, and converting the image data into second output image data representing a second output image adjusted to an appearance under the second viewing condition, based on a second profile including second spectral information corresponding to the second viewing condition; and
    a display step of displaying a display screen including the first output image and the second output image, based on the first output image data and the second output image data.

10. A non-transitory computer-readable storage medium storing a display information generation program, the display information generation program causing a computer to implement:
- an image data input function of accepting an input of image data representing an image;
- a viewing condition setting acceptance function of accepting a setting of a first viewing condition for the image and a second viewing condition for the image;
- a color conversion function of converting the image data into first output image data representing a first output image adjusted to an appearance under the first viewing condition, based on a first profile including first spectral information corresponding to the first viewing condition, and converting the image data into second output image data representing a second output image adjusted to an appearance under the second viewing condition, based on a second profile including second spectral information corresponding to the second viewing condition; and
- a display information generation function of generating display information representing a display screen including the first output image and the second output image, based on the first output image data and the second output image data.

* * * * *